US010165457B2

(12) United States Patent
Fernandez Arboleda et al.

(10) Patent No.: US 10,165,457 B2
(45) Date of Patent: Dec. 25, 2018

(54) SYSTEM AND METHOD FOR ROOT CAUSE ANALYSIS OF CALL FAILURES IN A COMMUNICATION NETWORK

(71) Applicant: Telefonaktiebolaget L M Ericsson (publ), Stockholm (SE)

(72) Inventors: Adolfo Fernandez Arboleda, Dallas, TX (US); Robert Dalgleish, Marblehead, MA (US); Ruben Morales Rodriguez, Dallas, TX (US); Michal Morawski, Plano, TX (US); Jaime Rodriguez Membrive, Malaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 296 days.

(21) Appl. No.: 14/821,102

(22) Filed: Aug. 7, 2015

(65) Prior Publication Data

US 2017/0041815 A1    Feb. 9, 2017

(51) Int. Cl.
  *H04W 24/08*   (2009.01)
  *H04W 24/04*   (2009.01)
  *H04L 12/24*   (2006.01)
  *H04W 76/27*   (2018.01)

(52) U.S. Cl.
  CPC .......... *H04W 24/08* (2013.01); *H04L 41/064* (2013.01); *H04W 24/04* (2013.01); *H04W 76/27* (2018.02)

(58) Field of Classification Search
  None
  See application file for complete search history.

(56) References Cited

U.S. PATENT DOCUMENTS

| 9,521,594 | B2 * | 12/2016 | Han | |
| 2007/0019559 | A1 * | 1/2007 | Pittelli | H04L 41/5035 370/248 |
| 2011/0028144 | A1 * | 2/2011 | Catovic | H04L 5/003 455/423 |

(Continued)

OTHER PUBLICATIONS

New Postcom, "*Discussions on mobility configuration storage*", Agenda Item 11.2.1, Discussion and Decision, 3GPP TSG RAN WG3 Meeting #76, R3-121109, Prague, Czech Republic, 4 pages, May 21-25, 2012.

(Continued)

*Primary Examiner* — Ayaz R Sheikh
*Assistant Examiner* — Tarell A Hampton
(74) *Attorney, Agent, or Firm* — Baker Botts, L.L.P.

(57) ABSTRACT

A method comprises generating an advanced signaling call flow and monitoring one or more finite states for one or more calls using the advanced signaling call flow. The method further comprises determining that there is a failure in one of the one or more monitored finite states for a particular call, and comparing one or more performance indicators to one or more respective thresholds, the one or more performance indicators associated with a cell in which the particular call took place and comprising information about the cell at the time of the failure. The method further comprises flagging one or more of the one or more performance indicators that do not satisfy their respective threshold, and determining a root cause of the failure based at least in part on one or more of the one or more flagged performance indicators and the advanced signaling call flow.

18 Claims, 16 Drawing Sheets

(56) References Cited

U.S. PATENT DOCUMENTS

| | | | | |
|---|---|---|---|---|
| 2011/0044285 A1* | 2/2011 | Jang | H04W 36/02 | |
| | | | 370/331 | |
| 2011/0117908 A1* | 5/2011 | Huang | H04W 76/028 | |
| | | | 455/423 | |
| 2012/0208562 A1* | 8/2012 | Wilkin | H04L 41/5067 | |
| | | | 455/456.3 | |
| 2012/0276936 A1* | 11/2012 | Ahn | H04W 76/028 | |
| | | | 455/501 | |
| 2012/0290870 A1* | 11/2012 | Shah | G06F 21/10 | |
| | | | 714/4.11 | |
| 2012/0307631 A1* | 12/2012 | Yang | H04L 47/127 | |
| | | | 370/230 | |
| 2013/0165108 A1* | 6/2013 | Xu | H04W 24/04 | |
| | | | 455/423 | |
| 2013/0178204 A1 | 7/2013 | Zhang et al. | | |
| 2014/0148174 A1* | 5/2014 | Teyeb | H04W 36/0083 | |
| | | | 455/441 | |
| 2014/0248882 A1* | 9/2014 | Wang | H04W 24/04 | |
| | | | 455/436 | |
| 2015/0031363 A1* | 1/2015 | Kordybach | H04W 36/0094 | |
| | | | 455/436 | |
| 2015/0092746 A1* | 4/2015 | Jang | H04W 24/08 | |
| | | | 370/331 | |
| 2015/0098448 A1* | 4/2015 | Xu | H04W 76/026 | |
| | | | 370/331 | |
| 2015/0131454 A1 | 5/2015 | Wegmann et al. | | |
| 2015/0208264 A1* | 7/2015 | Koskinen | H04W 52/0212 | |
| | | | 455/67.11 | |
| 2016/0044518 A1* | 2/2016 | Centonza | H04W 24/02 | |
| | | | 370/328 | |

OTHER PUBLICATIONS

PCT International Search Report and Written Opinion of the International Searching Authority, International Application No. PCT/IB2015/056036, 13 pages, dated Mar. 10, 2016.

JDSU NgN Analysis System, Dramatically Re-engineered for an Industry Revolution, http://nse.viavisolutions.com/ProductLiterature/ngnanalysis_br_nsd_tm_ae.pdf, 8 pages, Apr. 2010.

Keith Jackson and the Mind Tools Team, "Root Cause Analysis, Tracing a Problem to its Origins", Root Cause Analysis—Problem Solving From MindTools.com, http://www.mindtools.com/pages/article/new_TMC_80.htm, 6 pages, Downloaded Sep. 2, 2015.

Gladiator Innovations, "Root Cause Analysis (RCA) Toolbox & Analysis Center (AC)", http://www.gladiator-innovations.com/products/rca-root-cause-analysis, 2 pages, Downloaded Sep. 2, 2015.

* cited by examiner

SYSTEM AND METHOD FOR ROOT CAUSE ANALYSIS OF CALL FAILURES IN A COMMUNICATION NETWORK

TECHNICAL FIELD

The present disclosure relates, in general, to wireless communications and, more particularly, to methodologies for root cause analysis.

BACKGROUND

Root Cause Analysis (RCA) is a technique used in many different segments, such as medicine and engineering, for identifying the origin of a problem. Generally, RCA can be broken down to a series of steps to find the primary cause of the problem, so that you can determine what happened, determine why it happened, and figure out what to do to reduce the likelihood that it will happen again. RCA assumes that systems and events are interrelated. Thus, an action in one area triggers an action in another, and another, and so on. By tracing back these actions, you can discover where the problem started and how it grew into the symptom you're now facing.

Radio Access Network (RAN) optimization activities may be of particular concern in certain types of mobile communications, such as, for example, Long Term Evolution (LTE) and/or Voice over LTE (VoLTE) networks. For example, according to an existing solution, once a certain underperforming area has been identified, RAN network traces that store signaling messages interaction between a wireless device (also referred to as a UE) and an antenna may be recorded. Once the RAN network traces have finished recording, the files generated may be processed and converted to one or more formats that may be more suitable for analysis. The RAN network traces, after being converted to the formats suitable for analysis, may then be analyzed in order to determine what happened, to determine why it happened, and to figure out what to do to fix it. This process may be very time consuming.

Another existing solution for addressing problematic calls in a mobile communications system is found in Application WO2005/032186, which describes a method for performance management in a cellular mobile packet data network that captures raw traffic traces, builds a traffic and session database, defines a set of appropriate key performance indicators, and calculates key performance indicators. Still another approach, found in the BUSS CEA product, purports to create so-called Extended Session Records, where cell related information (RSCP, RSRP, . . . , CellID, . . . ) may be correlated with end-user application performance indicators on a session level. These products may use CTR, EBM, GPEH, or other related sources. According to another existing solution, software provides an internal message indicating the main reason why a call connection was interrupted.

These existing solutions may have certain deficiencies. For example, the reasons indicated for why a call connection was interrupted may be very generic, and may not provide enough information to make decisions and carry on optimization activities. Thus, further studies—including network recording traces and corresponding manual analysis is required. The message information, in combination with information extracted with processed network traces, may be used to create a basic logic to provide a diagnosis for the problematic call. Despite combining the two sources of information, the output of such an approach is still not valid. The output may be invalid for a variety of reasons, including inaccurate diagnosis and/or the fact that it fails to consider VoLTE specific issues. As another example, existing solutions may not support the LTE/VoLTE standard. Still other existing solutions may be based on Configuration Management (CM) and Performance Management (PM) Key Performance Indicators (KPI), which may be inefficient.

Other approaches attempt to address the problem of problematic calls in a mobile communications system using UE logs. ASCOM (TEMS investigation) is one example that provides a service/product that allows for setup of specific equipment for testing, collecting measurements, and post-processing of UE logs. The ASCOM solution offers a graphical interface for analysis of the collected information and troubleshooting to solve the issues detected. Other examples, such as the MobileCem (FalconLive solution) and Hasati solutions have developed drive test solutions similar to the ASCOM (TEMS solution), along with streaming data collection and transferring in the process. Ultimately, however, these solutions merely process the UE logs once received and provide a basic translation of the information into human-understandable logs for the engineers analyze.

These solutions, however, may also have certain deficiencies. For example, existing solutions based on UE logs are still very extended to provide services where there is not commercial traffic, so the use of testing UEs is needed. There are also services that require UE logs to perform deep in the field analysis, like First Office Applications (FOA) of new radio network systems features. Delivering these services may be complex because of the logistics involved in physically moving engineers to the field, setting up the equipment, collecting the measurements/UE logs raw data, uploading the measurements/UE logs raw data to remote servers, processing the collected UE logs, analyzing the processed data, and, if needed, performing troubleshooting activities. This complexity translates to a high cost for service providers, delays in networks evolution and consequently reduced margins.

The deficiencies of the various existing solutions are exacerbated at large scales, e.g., when the underperforming communication system to be optimized has hundreds (or even thousands) of wireless devices. The problem of scalability may make root cause determinations of problematic calls unmanageable. Thus, there is a need for an improved method of determining the root cause of problematic calls in a mobile communications system.

SUMMARY

To address the foregoing problems with existing solutions, disclosed is a method. The method comprises generating an advanced signaling call flow and monitoring one or more finite states for one or more calls using the advanced signaling call flow. The method further comprises determining that there is a failure in one of the one or more monitored finite states for a particular call, and comparing one or more performance indicators to one or more respective thresholds, the one or more performance indicators associated with a cell in which the particular call took place and comprising information about the cell at the time of the failure. The method further comprises flagging one or more of the one or more performance indicators that do not satisfy their respective threshold, and determining a root cause of the failure based at least in part on one or more of the one or more flagged performance indicators and the advanced signaling call flow.

In certain embodiments, generating an advanced signaling call flow may comprise obtaining information about a plurality of events in the cell, wherein the plurality of events comprise one or more of call specific events and cell specific events, the information about the plurality of events including time stamps, each time stamp indicating a time at which an associated one of the plurality of events occurred. Generating an advanced signaling call flow may further comprise correlating the information about the plurality of events in the cell with the one or more performance indicators associated with the cell based at least in part on the time stamp associated with each event, and generating the advanced signaling call flow based at least in part on the correlated information about the events and one or more performance indicators.

The obtained information about the plurality of events in the cell may comprise information about one or more of internal events and external events. The internal events may comprise one or more events generated in a network node that provide information related to the network node, and the external events may comprise one or more events generated external to the network node and provide information about signaling between the network node and one or more of a user equipment and a core network. The obtained information about the plurality of events in the cell may be based at least in part on one or more of: a Cell Trace Recording comprising a collection of events and radio related measurements applicable to a particular network node; a UE Trace Recording comprising a collection of events and radio related measurements applicable to a particular UE; one or more UE logs; and a time correlated combination of the Cell Trace Recording, the UE Trace Recording, and the one or more UE logs.

In certain embodiments, the one or more finite states for one or more calls may comprise Call Starts, RRC Connected, Intra-Cell Reconfiguration, Handover, RRC Re-Establishment, Call Ends, and Idle State. Monitoring one or more finite states for one or more calls may comprise monitoring the one or more finite states during processing of the advanced signaling call flow. Determining a root cause of the failure based at least in part on one or more of the one or more flagged performance indicators and the advanced signaling call flow may comprise determining a time of the call failure; determining a radio resource management procedure state at the time of the call failure; determining call and cell radio performance indicators at the time of the call failure; and evaluating information provided by one or more internal events before the time of the call failure.

Also disclosed is a system. The system comprises one or more processors and memory, the memory containing instructions executable by the processor, whereby the one or more processors are configured to generate an advanced signaling call flow and monitor one or more finite states for one or more calls using the advanced signaling call flow. The one or more processors are configured to determine that there is a failure in one of the one or more monitored finite states for a particular call, and compare one or more performance indicators to one or more respective thresholds, the one or more performance indicators associated with a cell in which the particular call took place and comprising information about the cell at the time of the failure. The one or more processors are configured to flag one or more of the one or more performance indicators that do not satisfy their respective threshold, and determine a root cause of the failure based at least in part on one or more of the one or more flagged performance indicators and the advanced signaling call flow.

Also disclosed is a computer program product. The computer program product comprises instructions stored on non-transient computer-readable media which, when executed by a processor, perform the acts of generating an advanced signaling call flow, and monitoring one or more finite states for one or more calls using the advanced signaling call flow. The instructions, when executed by the processor, perform the acts of determining that there is a failure in one of the one or more monitored finite states for a particular call, and comparing one or more performance indicators to one or more respective thresholds, the one or more performance indicators associated with a cell in which the particular call took place and comprising information about the cell at the time of the failure. The instructions, when executed by the processor, perform the acts of flagging one or more of the one or more performance indicators that do not satisfy their respective threshold, and determining a root cause of the failure based at least in part on one or more of the one or more flagged performance indicators and the advanced signaling call flow.

Certain embodiments of the present disclosure may provide one or more technical advantages. For example, certain embodiments may provide accurate results out of the automatic analysis of call failures. As another example, the embodiments described herein may reduce initial tuning and optimization services cost, while allowing network providers to maintain excellence in the service. As yet another example, the various embodiments described herein may allow for optimization services using industrial calls trace analysis, and thereby may advantageously reduce or eliminate the need for probes, which can be expensive and generate large and hardly manageable amounts of data for customers. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
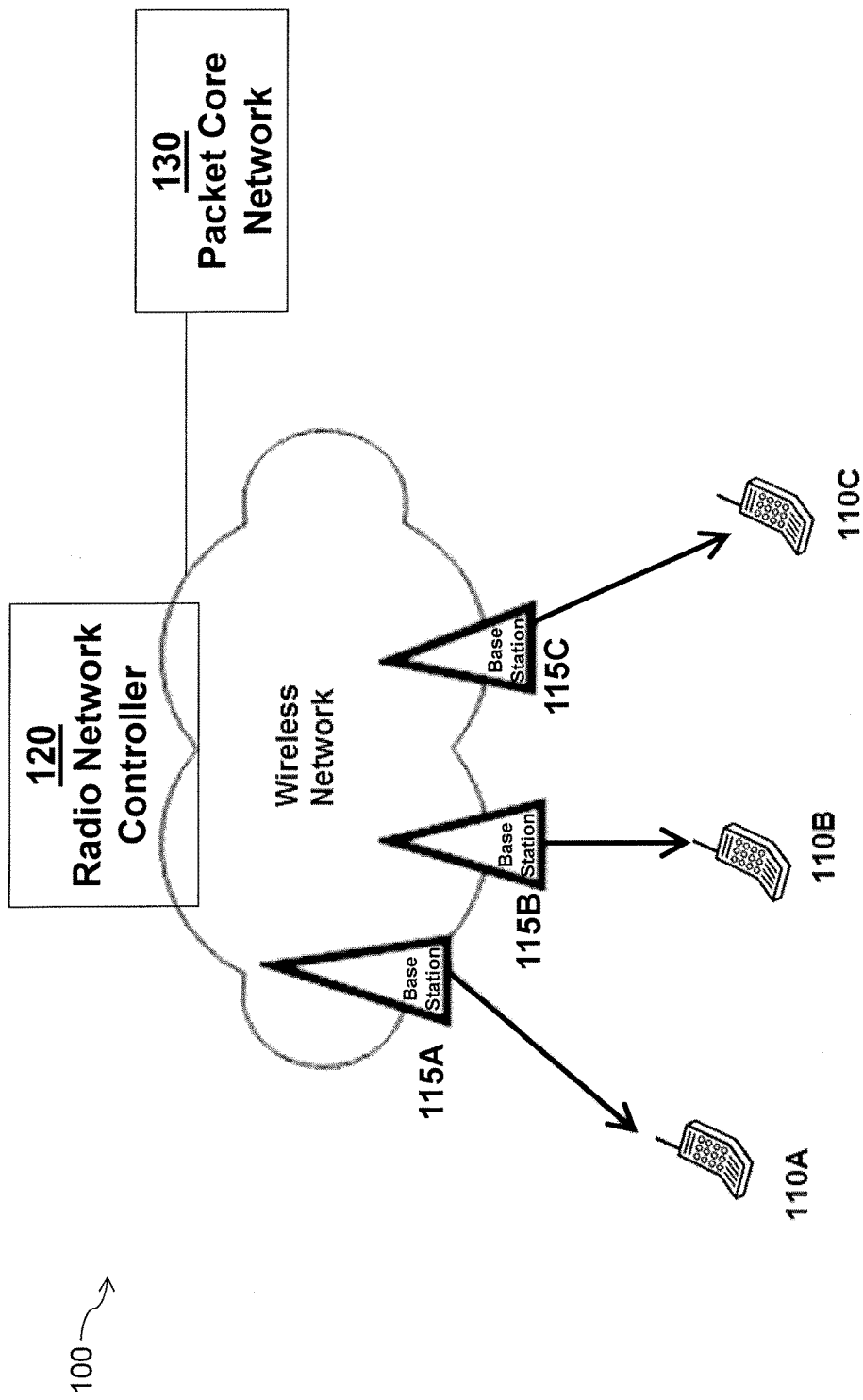
FIG. 1 is a is a block diagram illustrating an embodiment of a network, in accordance with certain embodiments.

The concept of RCA can be applied in mobile communication systems. One such case involves the application of RCA in Radio Access Network (RAN) optimization activities. Optimization activities may be of particular concern in certain types of mobile communications, such as, for example, Long Term Evolution (LTE) and/or Voice over LTE (VoLTE) networks. As described above, there is a need for an improved method of determining the root cause of problematic calls in a mobile communications system. The results obtained using existing solutions may suffer from certain deficiencies. For example, the results may not be accurate enough to rely on. In some cases, the solutions were developed without considering RCA fundamentals within their methodologies, which may lead to inaccurate problematic calls diagnosis, and is one reason why such solutions have not been successful. The present disclosure contemplates various embodiments that may address these and other deficiencies.

In certain embodiments, an advanced signaling call flow may be generated. The advanced signaling call flow may extract the useful information for every call in a communications network, such as a VoLTE network, from the Call Traces Recording (CTR) or UE Trace Recording (UETR) session. The advanced signaling call flow may be used to run a RCA engine, and provide the problematic call identification and diagnosis of the failure. The RCA engine may use a software model of a Finite-State Machine (FSM) defined by standard specifications governing communications in the communications network. For example, the methodology may consist of monitoring the finite-states, or procedures, that can occur during a call as per the standard specifications. For example, the methodology may consist of monitoring the finite-states that can occur during a VoLTE call as per the 3GPP standard specification. If any of these standardized procedures is not completed, this implies that there was an anomaly during the call. In such a case, a picture of all the performance indicators monitored is taken in order to evaluate the cause of the anomaly. Later on, this same call may have another unexpected failure, and so on. If the network is not able to recover from these problems, the call will eventually drop. Based at least in part on the continuous procedures monitoring, the various embodiments described herein allow the procedure that failed earlier to be identified as the root cause of the issue (i.e., the cause of the dropped call), and what procedures failed later as a consequence of the root cause. The detection of the abnormal patterns may be based in part on mobile communications standards (e.g., 3GPP) as well as best field practices in VoLTE Radio Frequency (RF).

Such an approach may be advantageous for a variety of reasons. For example, unlike existing solutions, which merely try to solve the problem by checking the end of the problematic call and provide, in most cases, inaccurate failures diagnoses, the embodiments described herein may provide accurate results out of the automatic analysis of the failures. This may be accomplished using FSM methodology, described in more detail below, and the quality of this analysis may be based at least in part on empirical algorithms specified by Subject Matter Expert (SME) engineers. Moreover, the embodiments described herein may reduce the VoLTE initial tuning and optimization services cost, while allowing network providers to maintain excellence in the service. As yet another example, the various embodiments described herein may allow for VoLTE optimization services using industrial calls trace analysis, and thereby minimize the need for probes, which hardware and software are expensive and generate large and hardly manageable amounts of data for customers.

FIG. 1 illustrates an example wireless communications network 100, in accordance with certain embodiments. Network 100 includes one or more wireless device(s) 110 (which may be interchangeably referred to as a user equipment (UE) 110), network node(s) 115 (which may be interchangeably referred to as eNBs 115), and core network node(s) 130. Network 100 may be any suitable kind of network. For example, network 100 may be a VoLTE network. A wireless device 110 may communicate with a network node 115 over a wireless interface. For example, wireless device 110A may transmit wireless signals to network node 115A and/or receive wireless signals from network node 115A. The wireless signals may contain voice traffic, data traffic, control signals, and/or any other suitable information. In some embodiments, an area of wireless signal coverage associated with a network node 115 may be referred to as a cell. In some embodiments, UEs 110 may have D2D capability (i.e., wireless devices 110 may be able to operate in D2D communications). Thus, UE 110 may be able to receive signals from and/or transmit signals directly to another UE. For example, UE 110A may be able to receive signals from and/or transmit signals to UE 110B.

In certain embodiments, network nodes 115 may interface with a radio network controller 120. The radio network controller 120 may control network nodes 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. In certain embodiments, the functions of radio network controller may be performed by network node 115.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. In certain embodiments, network nodes 115 may interface with one or more network nodes over an internode interface. For example, network nodes 115A and 115B may interface over an X2 interface. Example embodiments of wireless device 110, radio network node 115, and other network nodes (such as a radio network controller or core network node 130) are described with respect to FIGS. 7, 8, and 9, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between UEs or between a UE and another communication device (such as a landline telephone). Furthermore, although certain embodiments may be described as implemented in a VoLTE network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, network 100 may be any suitable network, such as an LTE network (FDD or TDD), UTRA network, CDMA network, WiMAX, GSM network, or any other suitable network employing any one or more radio access technologies (RATs) for cellular operation. The various embodiments described herein may be applicable to LTE FDD/TDD, WCDMA/HSPA, GSM/GERAN, Wi Fi, WLAN, WiMAX, CDMA2000, or any other suitable RAT.

As described above, wireless device 110A may transmit wireless signals to network node 115A and/or receive wireless signals from network node 115A. The wireless signals may contain voice traffic, data traffic, control signals, and/or any other suitable information. For example, wireless device 110A may attempt to place a call to another wireless device, such as wireless device 110B. In some cases, a problem may arise and the call will fail. According to some existing solutions, only a minimal level of detail may be provided as to circumstances of the call failure. This minimal amount of information may be insufficient to determine the root cause of the call failure. The present disclosure contemplates various embodiments for accurately and automatically providing a root cause analysis of a problematic call (e.g., a problematic VoLTE call) when the issue happens in the RAN. In certain embodiments, call traces may be used to generate an advanced signaling call flow. During processing of the advanced signaling call flow, every VoLTE call finite-state machine procedure may be monitored to identify the root cause that made the call fail, and what were the consequences. Moreover, certain embodiments may provide for scalability, allowing this analysis to be conducted in an automatic manner and for an unlimited number of cells.

Figure 2:
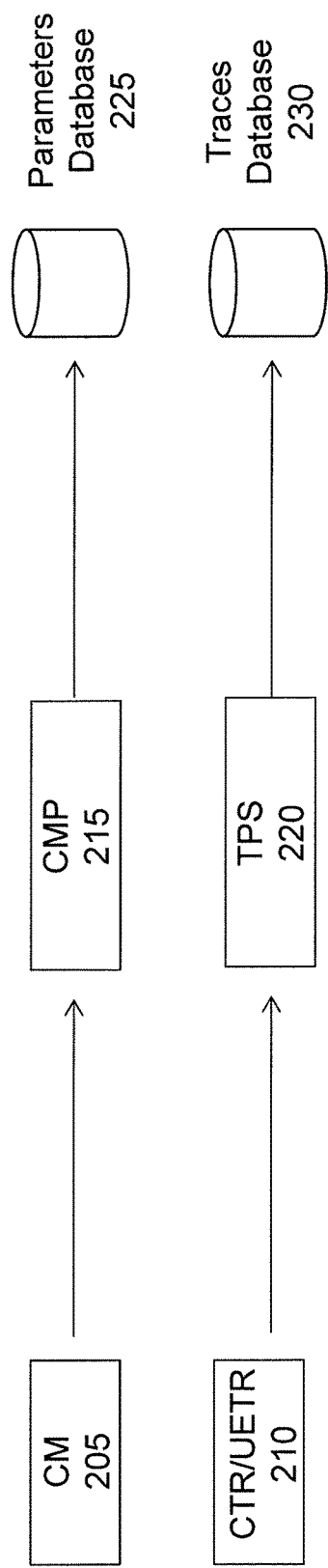
FIG. 2 illustrates the generation of a parameters database and a traces database for storing information for use in generating an advanced signaling call flow, in accordance with certain embodiments.

FIG. 2 illustrates the generation of a parameters database and a traces database for use in generating an advanced signaling call flow, in accordance with certain embodiments. More particularly, FIG. 2 illustrates configuration management unit 205, Cell Trace Recording (CTR) and/or UE Trace Recording unit (UETR) 210, configuration management processing (CMP) unit 215, trace processing server (TPS) 220, parameters database 225, and traces database 230.

Configuration management unit 205 may store configuration management files. Configuration management files may be used to obtain network node 115's configuration parameters (i.e., fingerprint of the network). CTR/UETR unit 210 may store CTRs and UETRs. TPS 220 may process the network traces into one or more suitable formats. For example, in certain embodiments TPS 220 may process CTRs and UETRs to a .BIN format for storage in traces database 230. CMP unit 215 may process configuration parameters into one or more suitable formats. For example, in certain embodiments CMP 215 may process configuration parameters to a .XML format for storage in parameters database 225. TPS 220 and CMP 215 may be any suitable configuration of hardware and/or software. For example, in some embodiments TPS 220 and CMP 215 may comprise Ericsson's Trace Processing Server (TPS) and OSS Data Gateway (ODG), respectively.

In certain embodiments, network traces (e.g., CTRs and UETRs) are used to collect events and radio related measurements or performance indicators. The events and radio related measurements may be applicable to a particular UE, such as wireless device 110, or a Radio Base Station (RBS), such as network node 115. The recordings may be collected in files over the course of a Recording Output Period (ROP). The ROP may be any suitable time period. For example, the ROP may be 15 minutes. The recording files may be retrieved and stored in memory. As one example, the recording files may be stored using the Ericsson software Operation Support System for Radio and Core (OSS-RC) local file directory.

The various embodiments described herein may use any suitable performance recording application. A particular communications network may support a variety of performance recording applications. For example, there are two types of performance recording applications supported in LTE: Cell Trace and UE Trace. The main difference between the Cell Trace and the UE Trace is that, in the UE Trace, it is the operator that decides which UE to record. In the Cell Trace, a trace for all UEs, or a subset of UEs in a selected cell, is recorded. The subset of UEs in a selected cell may be based on any suitable criteria.

In certain embodiments, an RBS, such as network node 115, may put information about each event received into the Cell Trace, the UE Trace, or in both traces, depending on what is activated. For file output, all recordings are accumulated into files for the duration of the ROP. The files may be organized in any suitable manner. For example, in a UE Trace, the recorded events may be reported separately and written to a separate file for each UE being recorded. In a Cell Trace, there may be three files (two for high priority Cell Trace scanners and one for normal priority Cell Trace scanners. The high priority Cell Trace scanners and normal priority Cell Trace scanners may be determined according to any suitable criteria.

One or more different event types may be available for recording the performance. For example, in certain embodiments, two different types of events may be available for recording the performance: internal events and external events. An internal event may be an event generated in network node 115 that is presented to the OSS-RC. Information about the internal events show the behavior of network node 115, and include information for events, procedures and periodic reports on network node 115 or UE 110 level. At the cell level, information may be recorded about the internal events, including information periodic reports. In certain embodiments, files containing information about the internal events may be categorized using a particular nomenclature. For example, the internal event files may have names starting with either INTERNAL_EVENT_ (event information), INTERNAL_PROC_ (procedure information), or INTERNAL_PER_ (information regarding periodic reports). With respect to information regarding periodic reports events (e.g., events with the name INTERNAL_PER_), these events may have a defined periodicity (for example, a periodicity of 1 second for UE Trace and 60 seconds for Cell Trace). The periodic reports events on UE, Radio Bearer (RB) and LCG level will, for Cell Trace only, be issued at UE release and at the end of ROP for long sessions. An external event is an event external to network node 115, such as Layer 3 Protocol messages in encoded ASN.1 format (e.g., RRC, S1, and X2). For example, external events may be UE signaling events, (e.g., events that show the signaling between network node 115 and UE 110, or between network node 115 and Core Network 130). In certain embodiments, the files containing information about the external events may be categorized using a particular nomenclature. For example, the external event files may have names starting with either RRC_, S1 or X2_.

In some cases, it may be desirable to send the internal and external event information as raw as possible (i.e., with as little processing as possible). Inputs, that may make the information easier to use, however, may be added. For example, in certain embodiments an instance time stamp or an indication of the serving cell may be added.

As described above, parameters database 225 may include information relating to one or more network nodes 115. For example, in certain embodiments parameters database 225 may include every eNB/cell parameter configuration in a communications network. The information may be organized in any suitable manner. For example, in certain embodiments the information may be organized in tables. Traces database 230 may include information relating to one or more events recorded during a network tracing session. The information relating to the one more events recorded during the network tracing session may be organized in any suitable manner. For example, traces database 230 may include tables with the information of the events recorded during the network tracing session.

Figure 3:
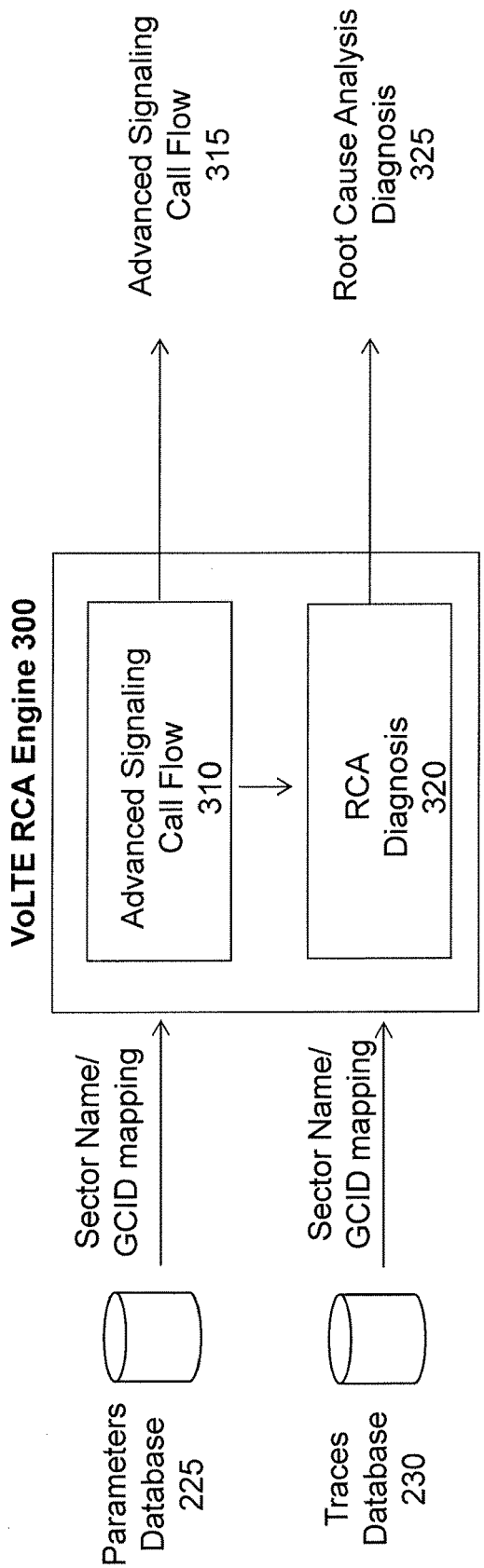
FIG. 3 is a schematic block diagram of the operation of a VoLTE RCA Engine, in accordance with certain embodiments.

FIG. 3 is a schematic block diagram of VoLTE RCA Engine 300, in accordance with certain embodiments. Once the configuration parameters and network traces have been processed and stored into parameters database 225 and traces database 230, respectively, VoLTE RCA Engine 300 may launch a number of queries. For example, VoLTE RCA Engine 300 may query parameters database 225 in order to create a mapping file. The mapping file may be created in any suitable manner. For example, in certain embodiments the mapping file is created to map the cell name to a Global Cell Id (GCID). This mapping may be used to translate GCID information into cell names that may be easier for an optimization engineer to understand. As another example, VoLTE RCA Engine 300 may launch one or more queries to parameters database 225 ad-hoc, i.e., on demand, to correlate Primary Cell Identifiers (PCI) with Cell Names using Cell Neighbor Lists. VoLTE RCA Engine 300 then queries the traces database 230 to create two main files: a signaling call flow of VoLTE calls and Cell Specific Key Performance Indicators (KPIs). The signaling call flow of VoLTE calls and the Cell Specific KPI files are used by advanced signaling call flow processor 310 of VoLTE RCA Engine 300 to perform a smart correlation of information and generate an advanced signaling call flow 315. In certain embodiments, VoLTE RCA Engine 300 may generate the signaling call flow using the information from the Cell and UE traces stored in traces database 230. VoLTE RCA Engine 300 may obtain cell specific KPIs in any suitable manner. In certain embodiments, VoLTE RCA Engine 300 may use UE logs instead of or in combination with the network traces (i.e., Cell Trace and UE Trace traces). The UE logs may be generated in any suitable manner. For example, the UE logs may result from drive tests and/or from customers' UEs that are modified to report such logs to the VoLTE RCA engine (e.g., using a special purpose application installed on the UEs).

In certain embodiments, instead of merely generating a simple consecutive number of events that happen one after another, advanced signaling call flow 315 provides a smart correlation of one or more sources of information. For example, advanced signaling call flow 315 may provide a smart correlation of information from call specific events, cell specific events, and any other suitable source of information.

VoLTE RCA Engine 300 uses time stamp information associated with the internal and external events as a reference to merge call and cell specific events within the same call flow. By using this methodology, VoLTE RCA Engine 300 generates an advanced signaling call flow with the consecutive events plus the most useful radio performance indicators from the specific call as well as radio indicators from the cell where the call is happening. Advanced signaling call flow 315 may provide any suitable information. For example, in certain embodiments advanced signaling call flow 315 may provide: CAW (a Call identifier within the TPS database); EventId (an Event identifier within the TPS database); GCID (Global Cell ID); EventCell (a cell that sends the event, which may be different than the serving cell); ServingCell (cell that is the serving cell at the time of the call); Time (time stamp when the event is recorded in the network trace session); Direction (if the event recorded in the network tracing session is received (Rx) in the cell or transmitted (Tx) by the cell); Event (name of the internal or external event recorded); RSRP (Reference Signal Received Power reported in every measurement report, and may be dragged during a timer specified by the user (default parameter is 7 seconds)); RSRQ (Reference Signal Received Quality reported in every measurement report, may be dragged during a timer specified by the user (default parameter is 7 seconds)); TA(m) (timing advance information received by the cell, this measurement may be dragged during a timer specified by the user (default parameter is 7 seconds)); QCI_Active (Quality Control Indexes active at the time of the call); QCI_Accum (summary of the Quality Control Indexes that have been established during the call); DlHarqFail (%) (Call KPI); UlHarqFail (%) (Call KPI); UlSinrPucch(db) (Call KPI); UlSinrPusch(db) (Call KPI); CQI (Channel Quality Indicator); UlRssiPusch(dbm) (Cell KPI); UlRssiPucch(dbm) (Cell KPI); PdcchUtil (%) (Cell KPI); DlPrbUtil (%) (Cell KPI); UlPrbUtil (%) (Cell KPI); Specific_Event_info (Information extracted from the Internal or External events that is useful to understand call behavior or will be used for VoLTE RCA Diagnosis); ASN1 Message. The various KPIs described above may be calculated in any suitable manner. For example, the various KPIs may be calculated from formulas including different measurements included in the call events. The different measurements may not be reported directly in those events.

Advanced signaling call flow 315 contains information used by RCA Diagnosis unit 320 of VoLTE RCA Engine 300 to provide the RCA Diagnosis 320. RCA Diagnosis unit 320 may use one or more RCA Diagnosis algorithms. The RCA diagnosis algorithms may be applied to advanced signaling call flow 315 described above, using a software model of the FSM defined by the communication network's standard specifications. The FSM may include any suitable finite states. For example, the finite states may include Call Starts and RRC Connected states. As another example, the finite states may include Intra-Cell Reconfiguration states, including intra-cell reconfiguration to establish/modify/release Radio Bearers, intra-cell reconfiguration to perform Handover, intra-cell reconfiguration to setup/modify/release Measurements, and/or to activate/de-activate TTI-Bundling feature. As a further example, the finite states may include handover procedures to transfer an on-going call to a new serving cell, including Intra-Frequency Handover, Inter-Frequency Handover, and Inter-Radio Access Technology Handover. As still further examples, the finite states may include RRC Re-Establishment (a procedure to re-establish the RRC connection when there is a Radio Link Failure (RLF)), Call Ends, Idle State, or any other suitable finite state.

Figure 4:
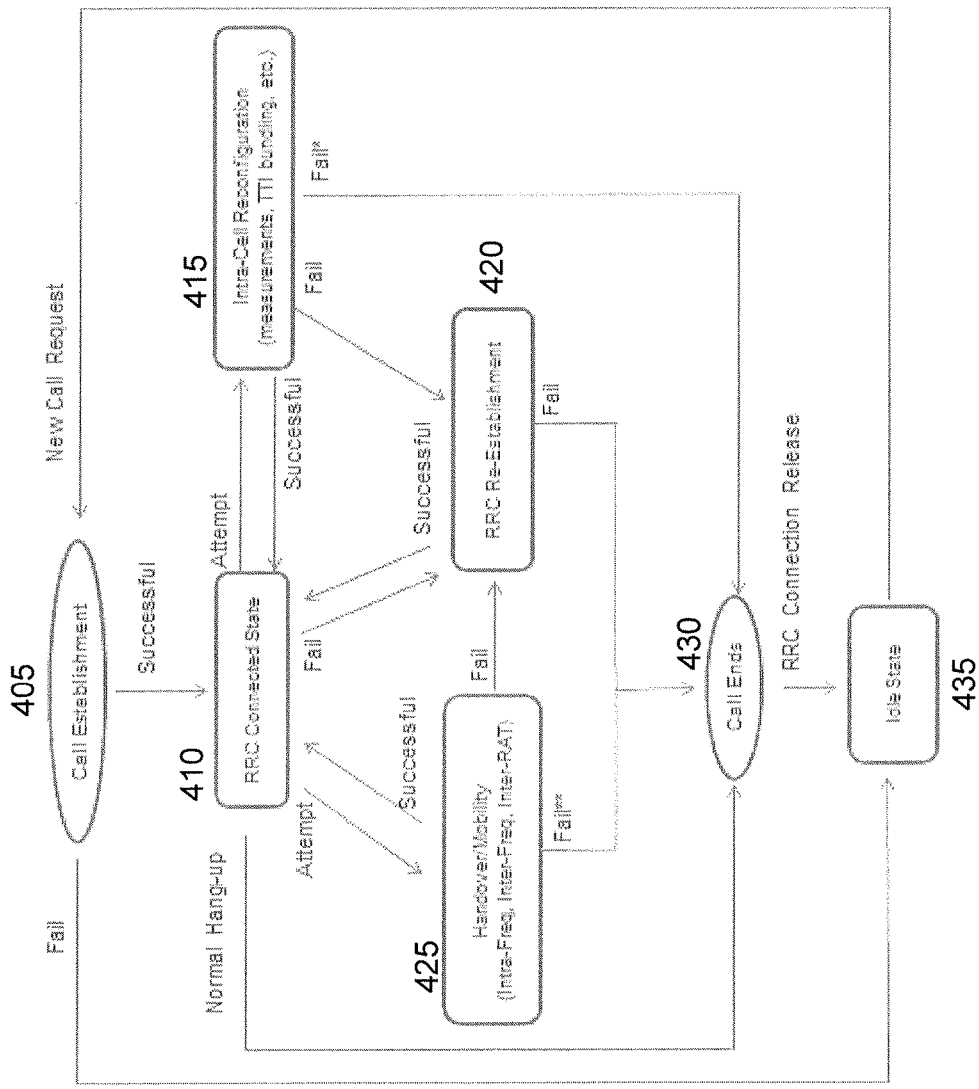
FIG. 4 illustrates an LTE/VoLTE finite-state machine, in accordance with certain embodiments.

FIG. 4 illustrates an LTE/VoLTE FSM, in accordance with certain embodiments. More particularly, FIG. 4 illustrates an FSM with the following finite states: Call Establishment State 405, RRC Connected State 410, Intra-Cell Reconfiguration State 415, RRC Re-Establishment State 420, Handover/Mobility State 425, Call Ends State 430, and Idle State 435.

Beginning at Call Establishment State 405, a call may transition among the finite call states depending on the success or failure or certain procedures during the call. For example, if call establishment at Call Establishment State 405 is successful, the call proceeds to RRC Connected State 410. From RRC Connected State 410, the call can transition to a number of possible states. As one example, if there is a normal hang-up, the call state may transition from RRC Connected State 410 to Call Ends State 430. As another example, if a handover is attempted, the call state will transition from RRC Connected State 410 to Handover/Mobility State 425. If the handover is successful, the call will transition back to RRC Connected State 410. If the handover fails, however, the call will transition to one of RRC Re-Establishment State 420 or Call Ends State 430. If RRC re-establishment at RRC Re-Establishment State 420 is successful, then the call will transition back to RRC Connected State 410. If RRC Re-Establishment fails, the call transitions to Call Ends State 430. From Call Ends State 430, RRC Connection is released and the call transitions to Idle State 435.

As another example, if, while in RRC Connected State 410, Intra-Cell Reconfiguration is attempted, then the call state transitions to Intra-Cell Reconfiguration State 415. If successful, the call state will transition back to RRC Connected State 410. If Intra-Cell Reconfiguration is unsuccessful, then the call state transitions to RRC Re-Establishment State 420 or Call Ends State 430. As described above, if RRC Re-Establishment is successful, then the call state proceeds to RRC Connected State 410. If RRC Re-Establishment fails, however, the call state proceeds to Call Ends State 430 and to Idle State 435 upon release of RRC Connection. From Idle State 435, the call state may transition to Call Establishment State 405 upon making a new call request. If call establishment fails at Call Establishment State 405, then the call state returns to Idle State 435.

VoLTE RCA Engine 300 described above monitors each of these states while processing advanced signaling call flow 315 for any number of VoLTE calls for which traces are recorded in traces database 230 to determine when there is a failure in any of the states. When this happens the call will go to RRC Re-Establishment State 420 or to Call Ends State 430. Although FIG. 4 illustrates one example of an FSM during a VoLTE/LTE call, other configurations are possible, and the present disclosure contemplates that the various embodiments described herein may be applied to any suitable configuration of FSMs. For example, in certain embodiments, a network node 115 may not support RRC Re-Establishment during some Intra-Cell Reconfiguration procedures. As another example, a network node 115 may not support RRC Re-Establishment when handover happens through the S1 interface.

Figure 5:
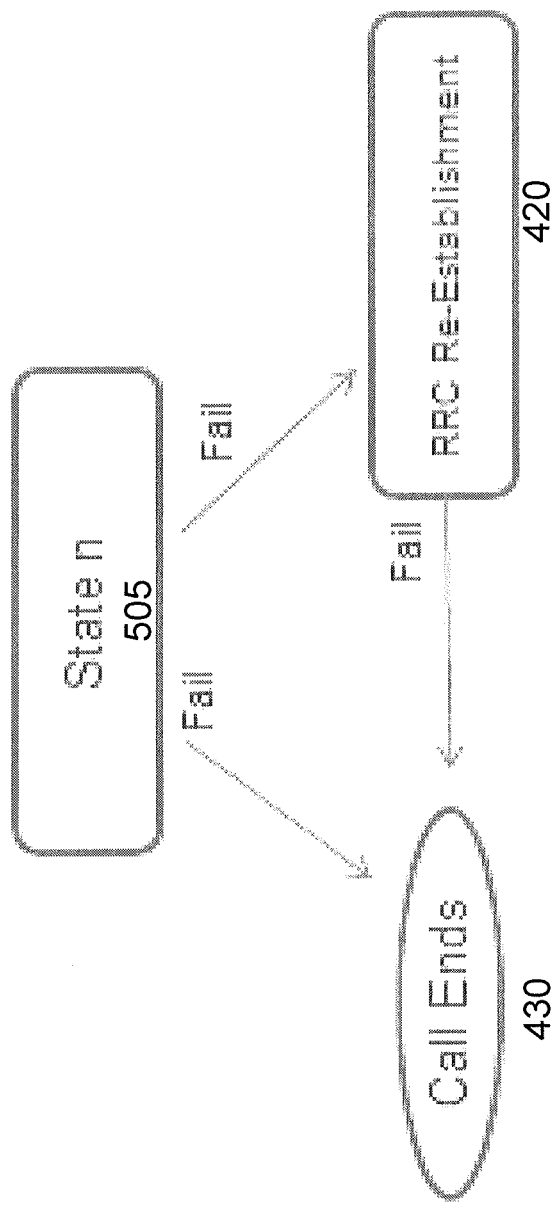
FIG. 5 illustrates the finite states after failure, in accordance with certain embodiments.

FIG. 5 illustrates the finite states after failure, in accordance with certain embodiments. Upon a failure at State n 505, the call proceeds to one of RRC Re-Establishment State 420 or Call Ends State 430. These failures may happen for several different reasons, but generally the failures are due to a physical radio problem (e.g., weak signal strength or interference) or due to a wrong or not optimized network parameter configuration. The mechanism to react against these eventual failures in order to save the call is RRC Re-Establishment State 420. This functionality may not be supported for in all procedures, thus some calls will go from State n 505 to Call Ends State 430.

When any of these finite states is not completed successfully, this is the first indication that something went wrong. The time stamp corresponding to when a state change to the incomplete or failed finite state was triggered is stored and used as a reference to determine the root cause of the problematic call. At this same time stamp, all the call and cell radio performance indicators described above are stored (e.g., DlHarqFail (%), UlHarqFail (%), UlSinrPucch(db), UlSinrPusch(db), CQI, UlRssiPusch(dbm), UlRssiPucch (dbm), PdcchUtil (%), DlPrbUtil (%), UlPrbUtil (%)). These indicators are compared against one or more respective thresholds before running RCA Diagnosis unit 320. The thresholds may be defined in any suitable manner. For example, in certain embodiments the one or more respective thresholds may be defined by the user. In some cases, default threshold settings may be used. For example, Table 1 below indicates some example default thresholds for call and cell radio performance indicators.

TABLE 1

Call or Cell Radio Performance Indicator Default Thresholds

| Call or Cell Radio Performance Indicator | Example Default Threshold Value |
|---|---|
| BAD_RSRP | −116 |
| BAD_RSRQ | −15 |
| DL_HARQ_ERROR_RATE_MAX | 50 |
| UL_HARQ_ERROR_RATE_MAX | 50 |
| UL_RSSI_PUCCH_MAX | −112 |
| UL_RSSI_PUSCH_MAX | −112 |
| CQI_MIN | 5 |
| UL_SINR_MIN | −5 |

If any of the performance indicators does not satisfy (e.g., below or above, as the case may be) its defined threshold, then the performance indicator is flagged and stored to be used for applying the RCA diagnosis algorithm of RCA Diagnoses unit 320.

This methodology allows advantageous information to be automatically detected, including the exact time when the call failed (from the radio point of view), what was the radio resource management procedure state, the Call and Cell radio performance indicators at that exact time, as well as information provided by the internal events before the failure happened. With this information, RCA Diagnosis unit 320 applying an RCA diagnosis algorithm is able to provide the Call ID to easily find the problematic call in the advanced signaling call flow for validation and/or deeper manual analysis, the ROP, the serving cell where the call failed, the time stamp, and the root cause of the problematic call. Table 2 below illustrates examples of the root cause of the problematic call that may be determined by RCA diagnosis unit 320.

TABLE 2

Example Root Causes for Problematic Call

Partial Handover
SRVCC S1 Handover Preparation Failed
SRVCC S1 Handover Execution Failed due to Execution Failure
SRVCC S1 Handover Execution Failed due to Timer Relocation Overall Expired
SRVCC S1 Handover Execution Failed due to Aborted by MME Release
SRVCC S1 Handover Execution Failed due to Handover Execution Aborted by Re-Establishment
SRVCC S1 Handover Execution Failed due to Digital Signal Processing (DSP) Restart
Intra-Frequency S1 Handover Preparation Failed
Intra-Frequency S1 Handover Preparation Failed due to Interference in Target Cell
Intra-Frequency S1 Handover Preparation Failed due to Capacity in Target Cell
Intra-Frequency S1 Handover Execution Failed due to Execution Failure
Intra-Frequency S1 Handover Execution Failed due to Timer Relocation Overall Expired
Intra-Frequency S1 Handover Execution Failed due to Aborted by MME Release
Intra-Frequency S1 Handover Execution Failed due to Handover Execution Aborted by Re-Establishment
Intra-Frequency S1 Handover Execution Failed due to Digital Signal Processing (DSP) Restart
Inter-Frequency X2 Handover Preparation Failed
Inter-Frequency X2 Handover Preparation Failed due to High Interference in Target Cell
Inter-Frequency X2 Handover Preparation Failed due to Capacity in Target Cell
Inter-Frequency X2 Handover Execution Failed due to PCI Confusion
Inter-Frequency X2 Handover Execution Failed due to Execution Failure
Inter-Frequency X2 Handover Execution Failed due to Timer Relocation Overall Expired
Inter-Frequency X2 Handover Execution Failed due to Aborted by MME Release
Inter-Frequency X2 Handover Execution Failed due to Handover Execution Aborted by Re-Establishment
Inter-Frequency X2 Handover Execution Failed due to Digital Signal Processing (DSP) Restart
Intra-Frequency X2 Handover Preparation Failed
Intra-Frequency X2 Handover Preparation Failed due to PCI Confusion
Intra-Frequency X2 Handover Preparation Failed due to Interference in Target Cell
Intra-Frequency X2 Handover Preparation Failed due to Capacity in Target Cell
Intra-Frequency X2 Handover Execution Failed due to Execution Failure
Intra-Frequency X2 Handover Execution Failed due to Timer Relocation Overall Expired
Intra-Frequency X2 Handover Execution Failed due to Aborted by MME Release
Intra-Frequency X2 Handover Execution Failed due to Handover Execution Aborted by Re-Establishment
Intra-Frequency X2 Handover Execution Failed due to Digital Signal Processing (DSP) Restart
Inter-Frequency X2 Handover Preparation Failed
Inter-Frequency X2 Handover Preparation Failed due to Interference in Target Cell
Inter-Frequency X2 Handover Preparation Failed due to Capacity in Target Cell
Inter-Frequency X2 Handover Execution Failed due to Execution Failure
Inter-Frequency X2 Handover Execution Failed due to Timer Relocation Overall Expired
Inter-Frequency X2 Handover Execution Failed due to Aborted by MME Release
Inter-Frequency X2 Handover Execution Failed due to Handover Execution Aborted by Re-Establishment
Inter-Frequency X2 Handover Execution Failed due to Digital Signal Processing (DSP) Restart
UL SINR PUCCH Fast Fading
UL SINR PUSCH Fast Fading
Bad Coverage (A2), no suitable Neighbor found (A3, A5, B2)
Bad RF (RSRP&RSRQ) Too Late Handover
Bad RF (RSRP&RSRQ) Suddenly Drop
Bad RF (RSRP&RSRQ) Measurement available but HO not triggered
Bad RF (RSRP) Bad Coverage only
Bad RF (RSRQ) Bad Interference only
High UL RSSI (PUCCH, PUSCH) in Serving Cell
High UL RSSI (PUCCH, PUSCH) in Target Cell
UL and DL HARQ Err (%)Failed at same time
UL HARQ Err (%) Failed first
DL HARQ Err (%) Failed first
Failed Intra-cell Reconfiguration during TTI Bundling activation
Failed Intra-cell Reconfiguration New event measurement configuration
Failed Intra-cell Reconfiguration in bad Interference situation
Failed Intra-cell Reconfiguration in bad coverage situation In addition to the root cause for the problematic call described above, the RCA diagnosis algorithm may also provide additional detailed information related to the specific call (e.g., target cell attempted, last distance measured from the eNB before dropping, etc.). RCA diagnosis algorithm may also provide S1 Drop Cause provided by the S1 UE Context Release event and/or Internal Drop Cause provided by the Ericsson Internal_UE_Context_Release.

In one example scenario, the RCA diagnosis algorithm may diagnose the root cause(s) of a call failure when a UE performs a successful handover from a source sector to a target sector but then loses its connection with the network due to interference on the uplink channel in the target sector. In the example scenario, the call is not immediately dropped after the handover. Instead, the network responds to the poor uplink channel quality by activating TTI bundling to keep the call alive. However, the TTI bundling does not adequately address the problem and the network takes additional measures, such as UE reconfiguration, to attempt to keep the call alive. Due to the poor uplink channel quality, however, the network does not receive any responses from the UE and the call is eventually dropped. Without knowing that the uplink channel quality is poor, the cause of the call failure could be difficult to detect since many problems could result in the UE failing to respond to the network. In one example embodiment, the process by which the RCA diagnosis algorithm determines the root cause of the call failure includes: 1) generating an advanced signaling call flow based on a plurality of call specific and cell specific events and performance indicators, 2) monitoring the finite states of the call using the advanced signaling call flow, 3) recognizing that there is a failure to successfully complete an Intra-Cell Reconfiguration State by, for example, recognizing that the advanced signaling call flow shows a state transition to the Intra-Cell Reconfiguration State but no subsequent transition to an RRC Connected State, 4) comparing various performance indicators having time stamps corresponding to the time of the unsuccessful state completion to their various respective preconfigured thresholds, 5) flagging the performance indicator related to uplink channel quality (e.g., UL_RSSI_PUSCH_MAX) as being above its corresponding threshold, and 6) determining the root cause of the call failure as poor uplink channel quality based on the flagged uplink channel quality performance indicator.

A similar process may be applied to diagnose any number of call failure causes. However, the particular state of the FSM that fails to successfully reach completion may differ and the various performance indicators that are flagged as not satisfying their respective thresholds may differ. Consequently, the RCA diagnosis algorithm may, depending on the particular circumstances of a call failure, diagnose a variety of different root causes, including a variety of different abstraction levels (e.g., a high, a middle, and a low level root cause). Thus, a root cause of a call failure output by the RCA diagnosis algorithm may include various levels of root cause information. Each of Tables 3a and 3b below lists various possible states in a VoLTE advanced signaling call flow at which failure could occur (i.e., at which completion of the state is unsuccessful) and a set of corresponding root cause diagnoses that could be reached depending on the various performance indicators and events of the advanced signaling call flow. (Table 3a lists handover related states and Table 3b lists non-handover related states.)

TABLE 3a

Example Root Causes and Corresponding FSM Handover State Failures

| Failed State | High Level Root Cause | Mid Level Root Cause | Low Level Root Cause |
| --- | --- | --- | --- |
| X2 HO Prep | IntraFreq Mobility | Ser./Tar. RSRP/RSRQ↑ (Good RSRP/RSRQ Threshold in Serving and Target, Good/Moderate Coverage or Moderate Interference) | X2 HO Prep Failed, or |
| | | | X2 HO Prep Failed TRelocOverall Expired, or |
| | | Tar. RSRQ ↓ (Target below RSRQ Threshold, Good/Moderate Coverage or Moderate Interference) | X2 HO Prep Aborted by MME Release or X2 HO Prep |
| | | Tar. RSRP↓ (Target below RSRP Threshold, Good/Moderate Coverage or Moderate Interference) | Aborted by Re-Establishment, or |
| | | Ser. RSRQ↓ (Serving below RSRQ Threshold, High Interference) | X2 HO Prep Failed Partial Node Restart, |
| | | Ser. and Tar. RSRQ↓ (Serving and Target below RSRQ Threshold, High Interference) | or X2 HO Prep Aborted by Release |
| | | Ser. RSRQ↓, Tar. RSRP↓ (Serving below RSRQ and Target below RSRP, High Interference) | |
| | | Ser. RSRP↓ (Serving below RSRP Threshold, Bad Coverage) | |
| | | Ser. RSRP↓, Tar. RSRQ↓ (Serving below RSRP and Target Below RSRQ, Bad Coverage) | |
| | | Ser. and Tar. RSRP↓ (Serving and Target Below RSRP Threshold, Bad Coverage) | |
| | InterFreq Mobility | Ser./Tar. RSRP/RSRQ↑ Tar. RSRQ ↓ Tar. RSRP↓ | |

TABLE 3a-continued

Example Root Causes and Corresponding FSM Handover State Failures

| Failed State | High Level Root Cause | Mid Level Root Cause | Low Level Root Cause |
|---|---|---|---|
| X2 HO Exec | IntraFreq Mobility | Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓<br>Ser./Tar. RSRP/RSRQ↑<br>Tar. RSRQ ↓<br>Tar. RSRP↓<br>Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓ | X2 HO Exec Failed, or<br>X2 HO Exec Failed TRelocOverall Expired, or<br>X2 HO Exec Aborted by MME Release, or<br>X2 HO Exec Aborted by Re-Establishment, or<br>X2 HO Exec Failed Partial Node Restart, or<br>X2 HO Exec Aborted by Release |
| | InterFreq Mobility | Ser./Tar. RSRP/RSRQ↑<br>Tar. RSRQ ↓<br>Tar. RSRP↓<br>Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓ | |
| S1 HO Prep | IntraFreq Mobility | Ser./Tar. RSRP/RSRQ↑<br>Tar. RSRQ ↓<br>Tar. RSRP↓<br>Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓ | S1 HO Prep Failed, or<br>S1 HO Prep Failed TRelocOverall Expired, or<br>S1 HO Prep Aborted by MME Release, or<br>S1 HO Prep Aborted by Re-Establishment, or<br>S1 HO Prep Failed Partial Node Restart, or<br>S1 HO Prep Aborted by Release |
| | InterFreq Mobility | Ser./Tar. RSRP/RSRQ↑<br>Tar. RSRQ ↓<br>Tar. RSRP↓<br>Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓ | |
| | iRAT/SRVCC Mobility | Ser./Tar. RSRP/RSRQ↑<br>Ser. RSRQ↓<br>Ser. RSRP↓ | S1 HO Prep Failed, or<br>S1 HO Prep Failed TRelocOverall Expired, or<br>S1 HO Prep Aborted by MME Release, or<br>S1 HO Prep Aborted by Re-Establishment, or<br>S1 HO Prep Failed Partial Node Restart, or<br>S1 HO Prep Aborted by Release |
| S1 HO Exec | IntraFreq Mobility | Ser./Tar. RSRP/RSRQ↑<br>Tar. RSRQ ↓<br>Tar. RSRP↓ | S1 HO Exec Failed, or<br>S1 HO Exec |

TABLE 3a-continued

Example Root Causes and Corresponding FSM Handover State Failures

| Failed State | High Level Root Cause | Mid Level Root Cause | Low Level Root Cause |
|---|---|---|---|
| | InterFreq Mobility | Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓<br>Ser./Tar. RSRP/RSRQ↑<br>Tar. RSRQ ↓<br>Tar. RSRP↓<br>Ser. RSRQ↓<br>Ser. and Tar. RSRQ↓<br>Ser. RSRQ↓, Tar. RSRP↓<br>Ser. RSRP↓<br>Ser. RSRP↓, Tar. RSRQ↓<br>Ser. and Tar. RSRP↓ | Failed TRelocOverall Expired, or S1 HO Exec Aborted by MME Release, or S1 HO Exec Aborted by Re-Establishment, or S1 HO Exec Failed Partial Node Restart, or S1 HO Exec Aborted by Release |
| | iRAT/SRVCC Mobility | Ser./Tar. RSRP/RSRQ↑<br>Ser. RSRQ↓<br>Ser. RSRP↓ | S1 HO Exec Failed, or S1 HO Exec Failed TRelocOverall Expired, or S1 HO Exec Aborted by MME Release, or S1 HO Exec Aborted by Re-Establishment, or S1 HO Exec Failed Partial Node Restart, or S1 HO Exec Aborted by Release |

TABLE 3b

Example Root Causes and Corresponding FSM Non-Handover State Failures

| Failed State | High Level Root Cause | Mid Level Root Cause | Low Level Root Cause |
|---|---|---|---|
| Failed IntraCell Reconfiguration, or Failed IntraCell Reconfiguration - SecondaryCellModification, or Failed IntraCell Reconfiguration - A1/A2/B2/Periodic Measurements, or Failed IntraCell Reconfiguration - A2/A3 Mobility Measurements, or Failed IntraCell Reconfiguration - A5 Mobility Measurements, or Failed IntraCell Reconfiguration - Periodic Measurements, or Failed IntraCell Reconfiguration - TTI Bundling, or Failed IntraCell | Quality | No A2 reported<br>A2 (RSRP\RSRQ)<br>A2 Search (RSRP\RSRQ)<br>A2 Critical (RSRP\RSRQ)<br>Multiple A2 Search (RSRP\RSRQ)<br>Multiple A2 Critical (RSRP\RSRQ) | One or more of:<br>No Suitable Neighbor Found<br>TTI Bundling OFF<br>TTI Bundling ON<br>NB available but HO NOT triggered |
| | Coverage | No A2 reported<br>A2 (RSRP\RSRQ)<br>A2 Search (RSRP\RSRQ)<br>A2 Critical (RSRP\RSRQ)<br>Multiple A2 Search (RSRP\RSRQ)<br>Multiple A2 Critical (RSRP\RSRQ) | NB meassure but not good enough<br>NB measured but weaker RSRP<br>Lack of Dominance<br>Excessive Overlapping |
| | Good RF | No A2 reported<br>A2 (RSRP\RSRQ) | NB Not Found - SRVCC ON |

TABLE 3b-continued

Example Root Causes and Corresponding FSM Non-Handover State Failures

| Failed State | High Level Root Cause | Mid Level Root Cause | Low Level Root Cause |
|---|---|---|---|
| Reconfiguration configuring new measurements, or Failed LTE HO - Mobility Control Configuration missed, or multiple bad coverage events (A2) received, or No On-going Procedure when Abnormal Release, or No On-going Procedure when Abnormal Release, or No procedure on-going when abnormal RRC release | | A2 Search (RSRP\RSRQ) A2 Critical (RSRP\RSRQ) Multiple A2 Search (RSRP\RSRQ) Multiple A2 Critical (RSRP\RSRQ) | NB Not Found - SRVCC ON, Voice Prio -1 UTRAN NB Not Found - SRVCC OFF UlSinrPucch Threshold UlSinrPusch Threshold PDCCH synchronization failure |

In some cases, other information may be used to generate advanced signaling call flow 315. For example, in certain embodiments UE logs may be used to accurately and automatically determine the root cause of a problematic call when the issue happens in the RAN. The UE logs are used to monitor the FSM procedure, identify the root cause of the call failure, and identify the consequences.

Figure 6:
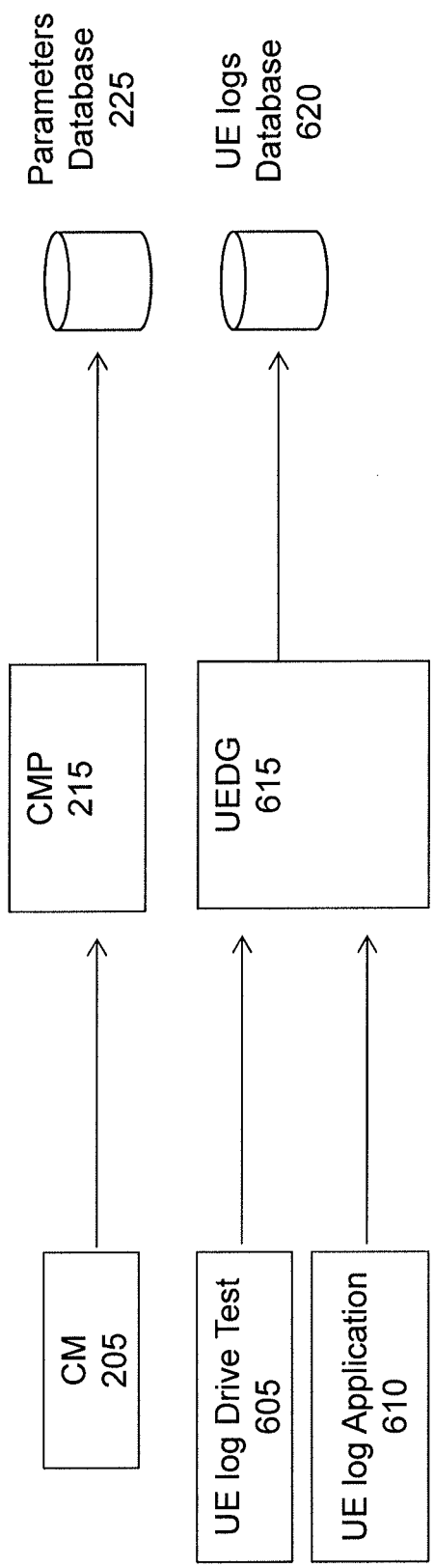
FIG. 6 illustrates the generation of a parameters database and a UE logs database for storing information for use in generating an advanced signaling call flow, in accordance with certain embodiments.

FIG. 6 illustrates the generation of parameters database 225 and UE logs database 625 for storing information for use in generating advanced signaling call flow 315, in accordance with certain embodiments. More particularly, FIG. 6 illustrates configuration management unit 205, UE Log Drive Test unit 605, UE Log Application 610, CMP unit 215, UE Data Gateway (615), parameters database 225, and UE logs database 620.

As described above, CMP unit 205 may store configuration management files. Configuration management files may be used to obtain network node 115's configuration parameters (i.e., fingerprint of the network). CMP unit 215 may process configuration parameters into one or more suitable formats. For example, in certain embodiments CMP 215 may process configuration parameters to a .XML format for storage in parameters database 225. Parameters database 225 may include tables following the Managed Object Ericsson Model with one or more eNB/cell parameter configuration. UE Data Gateway (615) and CMP 215 may be any suitable configuration of hardware and/or software. For example, in some embodiments CMP 215 may comprise Ericsson's OSS Data Gateway (ODG), respectively.

UE Log Drive Test unit 605 and UE Log Application 610 may be used to collect UE logs. For example, UE Log Drive Test unit 605 may be one or more available drive test solutions. As another example, UE Log Application 610 may be a local application installed on one or more UEs 110 that enables access to the chipset of the devices. UE Log Application 610 is then able to collect all the needed information to perform subsequent analysis. In some cases, the use of UE Log Application 610 instead of UE Log Drive Test unit 605 may advantageously alleviate certain problems described above, such as those associated with physically moving engineers to the field and setting up equipment. In certain embodiments, using UE Log Application 610 for collecting UE logs advantageously makes the solution scalable by not only allowing the analysis to be performed on drive test UEs, but also every UE with the application installed. After collecting, streaming and processing the UE logs collected by the available drive test solutions in the market or by the application installed in commercial or non-commercial UEs, VoLTE RCA engine 300 may process and produce an advanced signaling call flow 315 and provide the problematic call identification and diagnosis of the failure.

UE logs collected by UE Log Drive Test unit 605 and/or UE Log Application 610 may include any suitable data. For example, in certain embodiments UE Log Drive Test unit 605 and UE Log Application 610 may collect radio frequency indicators and/or UE call signaling events. The UE call signaling events may show the signaling between network node 115 and UE 110 or between network node 115 and the core network/IMS containing specific protocols and added information. The Radio Frequency indicators may include one or more of: Date; Time_In_Ticks; IMEI; IMSI; Latitude; Longitude; Technology; Physical_Cell_Id; DL_Freq; UL_Freq; DL_Bandwidth; UL_Bandwidth; Cell_Identity; Tracking_Area_Code; Freq_Band_Indicator; Inst_RSRP_Rx0; Inst_RSRP_Rx1; Inst_RSRP; Inst_RSRQ_Rx0; Inst_RSRQ_Rx1; Inst_RSRQ; Inst_RSSI_Rx0; Inst_RSSI_Rx1; Inst_RSSI; Rach Cause; Rach Result; Sinr_Instant; Average_Sinr_Instant; Sinr_Rx0; Average_Sinr_Rx0; Sinr_Rx1; Average_Sinr_Rx1; UL_WideBand_CQI_CW[0]; QAM_Status; Resource_Block_Allocated; Timing_Advance_Report; UE_Tx_PUSCH_Power; UE_Tx_PUCCH_Power; UE_TX_POWER; RLC_DL_Throughput; RLC_UL_Throughput; and DL_HARQ_Retx_Rate. The UE Call Signaling information may include Date; Time_In_Ticks; IMEI; IMSI; Latitude; Longitude; Technology; Protocol; MessageName; Cell ID; MsgDirection; Decoded Message; and any other suitable information. The protocols may include RRC (Layer 3); RACH; SIP; EPS Mobility Management; EPS Session Management; and any other suitable protocol.

UE Data Gateway 615 may process the UE logs into one or more suitable formats. For example, in certain embodiments UE Data Gateway 615 may process UE logs to a .BIN format for storage in UE logs database 620. UE logs database 620 may contain tables with the information of the specific protocols, events, and RF performance indicators recorded during the UE recording session.

Figure 7:
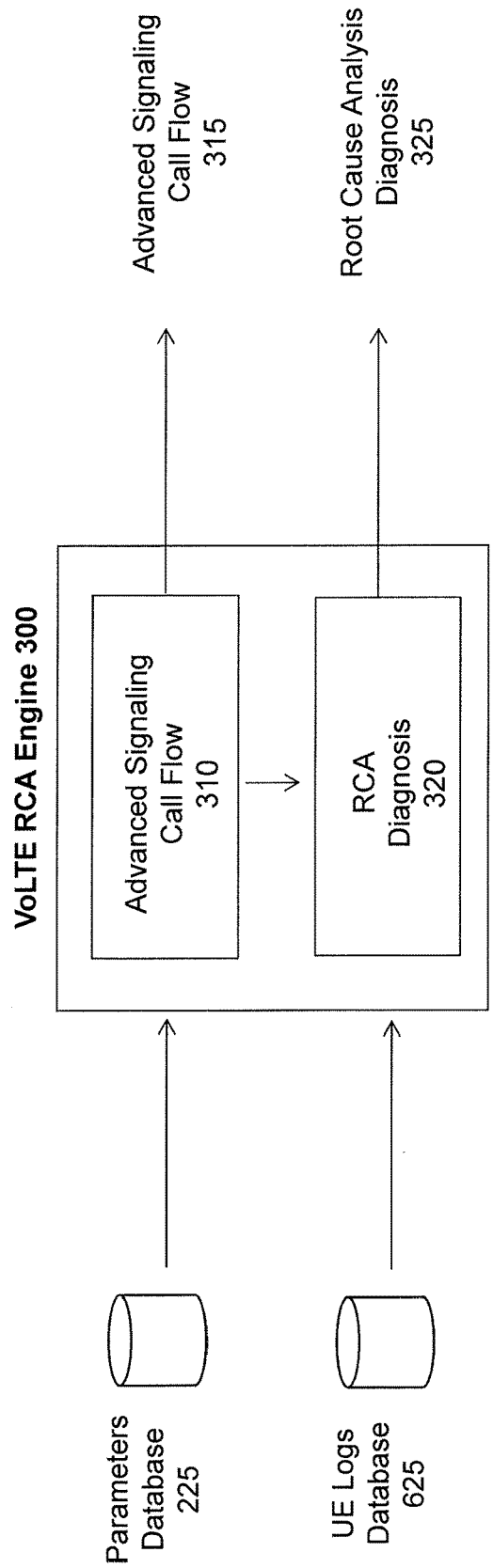
FIG. 7 is a schematic block diagram of the operation of the VoLTE RCA Engine, in accordance with certain embodiments.

FIG. 7 is a schematic block diagram of the operation of VoLTE RCA Engine 300, in accordance with certain embodiments. Once the configuration parameters information and UE logs are processed and stored in parameters database 225 and UE logs database 625, respectively, VoLTE RCA Engine 300 launches one or more queries to both databases in order to generate advanced signaling call flow 315 as described above, except UE logs are used instead of the network trace information. Note that in the case where UE logs are used, however, the radio performance indicators from the serving cell/network node where the UE is connected and making the call are not available, so this information may not be used.

Advanced signaling call flow 315 generated by advanced signaling call flow processor 310 may include any suitable information. For example, where UE logs are used, advanced signaling call flow 315 may provide: SessionId (an identifier of the session provided by drive test equipment or application software); CallId (an algorithm may generate a call identifier internally for VoLTE RCA Engine 300 that is provided later on in the output of VoLTE RCA Engine 300 together with the description of the failure); GCID (Global Cell ID); EventCell (the cell that sends the event, which for the UE logs use case will be the serving cell); Time (time stamp when the event is recorded in the network trace session); Direction (if the event recorded in the network tracing session is received (Rx) in the cell or transmitted (Tx) by the cell); Protocol (protocol of the event recorded at every specific time stamp); Event (name of the event recorded); RSRP (Reference Signal Received Power reported in every measurement report—this measurement is dragged during a timer specified by the user (default parameter is 4 seconds)); RSRQ (Reference Signal Received Quality reported in every measurement report—this measurement is dragged during a timer specified by the user (default parameter is 4 seconds)); TA(m) (Timing Advance information received by the cell this measurement is dragged till a new TA report is received); QCI_Active (Quality Control Indexes active at the time of the call); DLHarqReTx (%) (Call KPI); DLSINR(db) (Call KPI); RLC THP(kbps) (Call KPI); UE_TX_POWER (Call KPI); CQI (Channel Quality Indicator); Specific_Event_info (information extracted from the coded events from the protocols specified that is useful for the call behavior understanding and that is used by VoLTE RCA Engine 300); ASN1 Message (coded message for debugging purposes); or any other suitable information. The KPIs described above may be obtained from the UE's chipset by the drive test equipment or the application installed in the UEs. Thus, advanced signaling call flow 315 includes all the information that is used by VoLTE RCA Engine 300 to provide the RCA Diagnosis 325.

As described above, RCA Diagnosis algorithms may be applied to advanced signaling call flow 315 using a software module of the FSM defined by the communication network's standard specification. In this case where UE logs are used, however, different indicators may be used for the RCA diagnosis due to the nature of the data source. These indicators are the call KPIs described above. At the time stamp stored when a state change to the incomplete or failed finite state was triggered, the call and cell radio performance indicators previously listed are stored. These may include: DlHarqFail (%); UlHarqFail (%); UlSinrPucch(db); UlSinrPusch(db); CQI; UlRssiPusch(dbm); UlRssiPucch(dbm); PdcchUtil (%); DlPrbUtil (%); UlPrbUtil (%); or any other suitable call and/or cell radio performance indicator.

The performance indicators are compared against one or more respective thresholds before running RCA Diagnosis unit 320. The thresholds may be defined in any suitable manner. For example, in certain embodiments the one or more respective thresholds may be defined by the user. In some cases, default threshold settings may be used. For example, Table 4 below indicates some default thresholds for call and cell radio performance indicators when UE logs are used.

TABLE 4

Call or Cell Radio Performance Indicator Default Thresholds

| Call or Cell Radio Performance Indicator | Example Default Threshold Value |
|---|---|
| DETAILED_DOMINANCE_ISSUES | False |
| DT_BAD_RSRP | −116 |
| DT_BAD_RSRQ | −16 |
| DT_DOMINANCE_WINDOW | 5 |
| DT_DLHARQ_RETX_RATE_HIGH | 75 |
| DT_DLSINR_LOW | −2 |
| DT_CQI_LOW | 3 |

If any of the performance indicators does not satisfy (e.g., below or above, as the case may be) its defined threshold, then the performance indicator is flagged and stored to be used for applying the RCA diagnosis algorithm of RCA Diagnoses unit 320.

This methodology may advantageously allow information to be automatically detected, including the exact time when the call failed (from the radio point of view), what was the radio resource management procedure state, the Call and Cell radio performance indicators at that exact time, as well as information provided by the internal events before the failure happened. With this information, RCA Diagnosis unit 320 applying an RCA diagnosis algorithm is able to provide the Session ID, the Internal Call ID to easily find the problematic call in the advanced signaling call flow for validation and/or deeper manual analysis, the serving cell where the call failed, the time stamp, the type of failure (e.g., Radio Link Failure (when there is a successful re-establishment) or Drop (when there is no successful/attempted re-establishment)), the root cause of the problematic call, and detailed information to provide extra information related to the specific call (e.g., target cell attempted, last distance measured from the eNB before dropping, etc.).

In certain embodiments, advanced signaling call flow 315 may be generated using any suitable combination of UE logs and network traces. The combination may depend on the nature of the data inputs. For example, in some cases a combination of UETR and UE logs from drive test may be used. As another example, in some cases a combination of CTR and UE logs from the UE Log Application installed in commercial or non-commercial devices may be used. VoLTE RCA Engine 300 may accurately and automatically provide root cause analysis of problematic calls based on the combination of different data sources. In addition, in certain embodiments VoLTE RCA Engine 300 may accurately determine whether the root cause of the call failure was due to a problem in the DL or UL direction of the radio channel. For example, in some cases network traces and UE logs may both be used to generate advanced signaling call flow 315. In such a case, cell configuration parameters, UE logs, and network traces may be used to monitor every FSM procedure and KPI available to identify the root cause of a call failure according to RF engineering and 3GPP specifications. In such an embodiment, VoLTE RCA Engine 300 provides a scalable solution due to the advanced and automated data processing mediation layer, which allows for a scalable smart combination of high volume data from the different sources and formats to build the FSM RCA signatures algorithms. The RCA automatic data analysis algorithms are based on best practices from subject matters experts.

Figure 8:
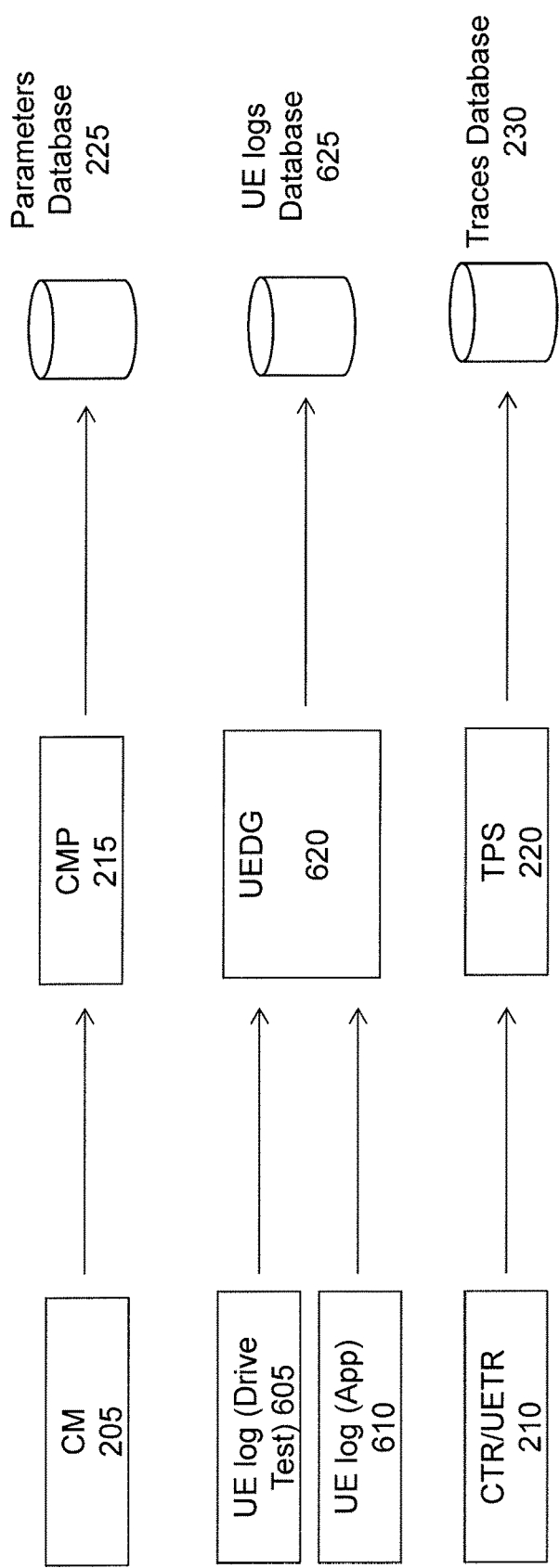
FIG. 8 illustrates the generation of a parameters database, a traces database, and a UE logs database for storing information for use in generating an advanced signaling call flow, in accordance with certain embodiments.

FIG. 8 illustrates the generation of a parameters database, a traces database, and a UE logs database for storing information for use in generating advanced signaling call flow 315, in accordance with certain embodiments. More particularly, FIG. 8 illustrates configuration management unit 205, CMP unit 215, parameters database 225, UE Log (Drive Test) unit 605, UE Log Application 610, UE Data Gateway 620, UE logs database 620, CTR/UETR 210, TPS 220, and traces database 230.

As described above, configuration management unit 205 may store configuration management files. Configuration management files may be used to obtain network node 115's configuration parameters (i.e., fingerprint of the network). CMP unit 215 may process configuration parameters into one or more suitable formats. For example, in certain embodiments CMP 215 may process configuration parameters to a .XML format for storage in parameters database 225. Parameters database 225 may include tables following the Managed Object Ericsson Model with one or more eNB/cell parameter configuration. CMP 215 may be any suitable configuration of hardware and/or software. For example, in some embodiments CMP 215 may comprise Ericsson's OSS Data Gateway (ODG), respectively.

UE Log Drive Test unit 605 and UE Log Application 610 may be used to collect UE logs. UE Data Gateway 615 may process the UE logs into one or more suitable formats. For example, in certain embodiments UE Data Gateway 615 may process UE logs to a .BIN format for storage in UE logs database 620. UE logs database 620 contains tables with the information of the specific protocols, events, and RF performance indicators recorded during the UE recording session. UEDG 615 may be any suitable configuration of hardware and/or software.

CTR/UETR unit 210 may store CTRs and UETRs. TPS 220 may process the network traces into one or more suitable formats. For example, in certain embodiments TPS 220 may process CTRs and UETRs to a .BIN format for storage in traces database 230. TPS 220 may be any suitable configuration of hardware and/or software. For example, in some embodiments TPS 220 may comprise Ericsson's Trace Processing Server (TPS).

In certain embodiments, the UE logs and network traces used to generate advanced signaling call flow 315 can be used to accurately detect whether the root cause was due to a DL or an UL radio issue. This information may be especially relevant when performing deep troubleshooting and/or complex, high-interference optimization scenarios where the maximum level of analysis is needed (e.g., the complexity introduced by services like VoLTE and Video Over LTE (ViLTE). In cases where both UE logs and network traces are used, the configuration information, UE logs, and Network traces may be processed as described above with respect to FIGS. 2 and 3 (describing an embodiment in which network traces are used to generate advanced signaling call flow 315) and FIGS. 6 and 7 (describing an embodiment in which UE logs are used to generate advanced signaling call flow 315).

Figure 9:
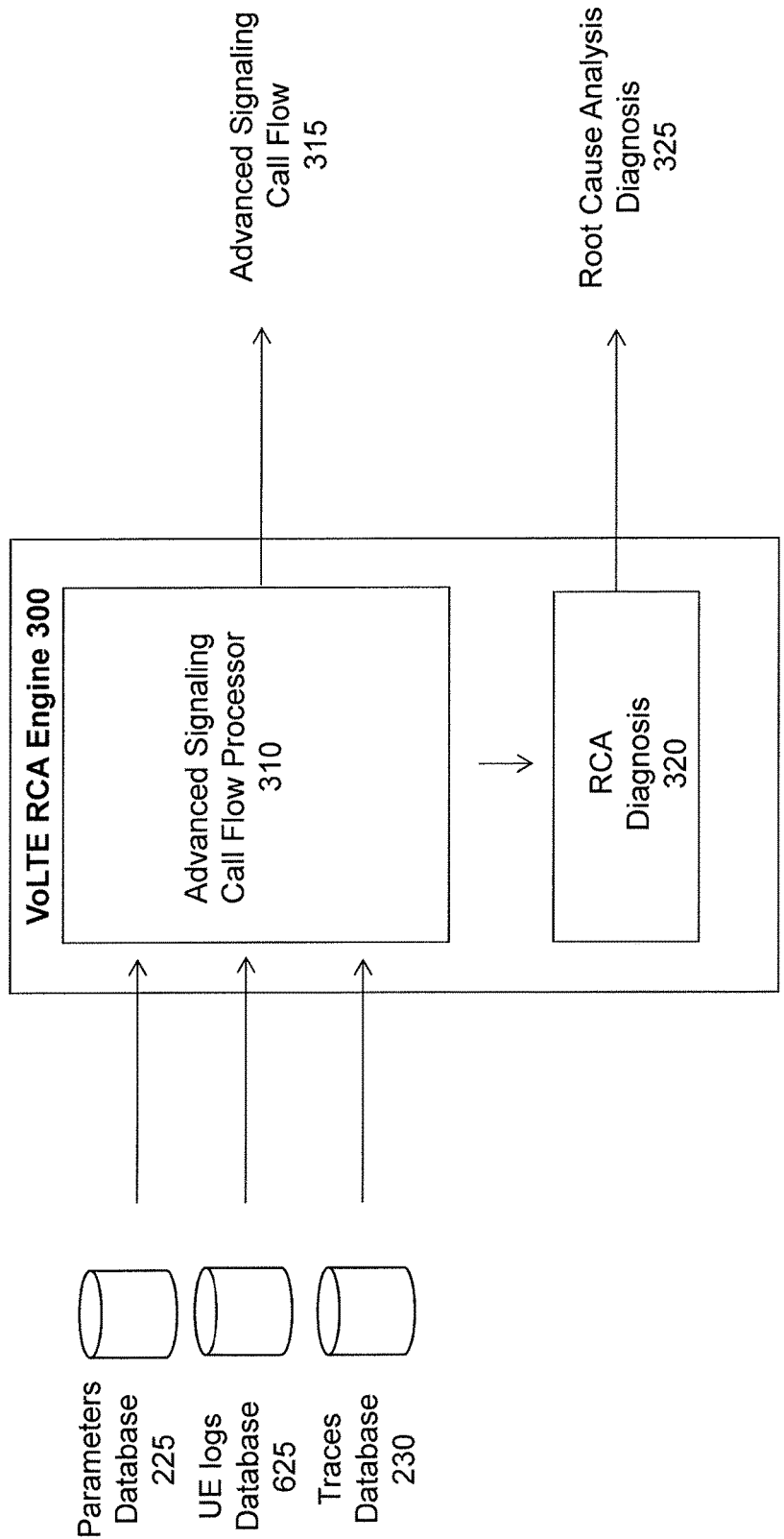
FIG. 9 is a schematic block diagram of the operation of the VoLTE RCA Engine, in accordance with certain embodiments.

FIG. 9 is a schematic block diagram of the operation of the VoLTE RCA Engine 300, in accordance with certain embodiments. Once the configuration parameters, UE logs, and network trace information is processed and stored in parameters database 225, UE logs database 625, and traces database 230, respectively, advanced signaling call flow processor 310 combines the UE and Network data sources to generate advanced signaling call flow 315.

Advanced signaling call flow 315 generated using the combination of configuration parameter information, UE logs, and network traces includes signaling messages and radio KPI from UEs and network nodes in the same file. Thus, advanced signaling call flow 315 provides an innovative source of information for engineers performing troubleshooting manually, as well as a tremendously useful tool for finding new signature patterns to be implemented in RCA Diagnosis unit 320 for automatic detection. In some cases, advanced signaling call flow 315 may advantageously be used to show that signaling messages have been properly transmitted and received. This may be the case even when there are no problems in the radio communication channel. For example, messages that have been properly transmitted and received appear duplicated in advanced signaling call flow 315. Thus, both the message sent by network node 115 from the network traces data source and the same message received by the UE 110 from the UE logs data source (and the other way around) can be seen. If there is a failure in the radio communication channel, however, and that failure leads to a lost message, advanced signaling call flow 315 will show only one of the messages. For example, advanced signaling call flow 315 may show the message transmitted from UE 110 or network node 115, but the message that should have been received in network node 115 or UE 110 may be missing.

Figure 10:
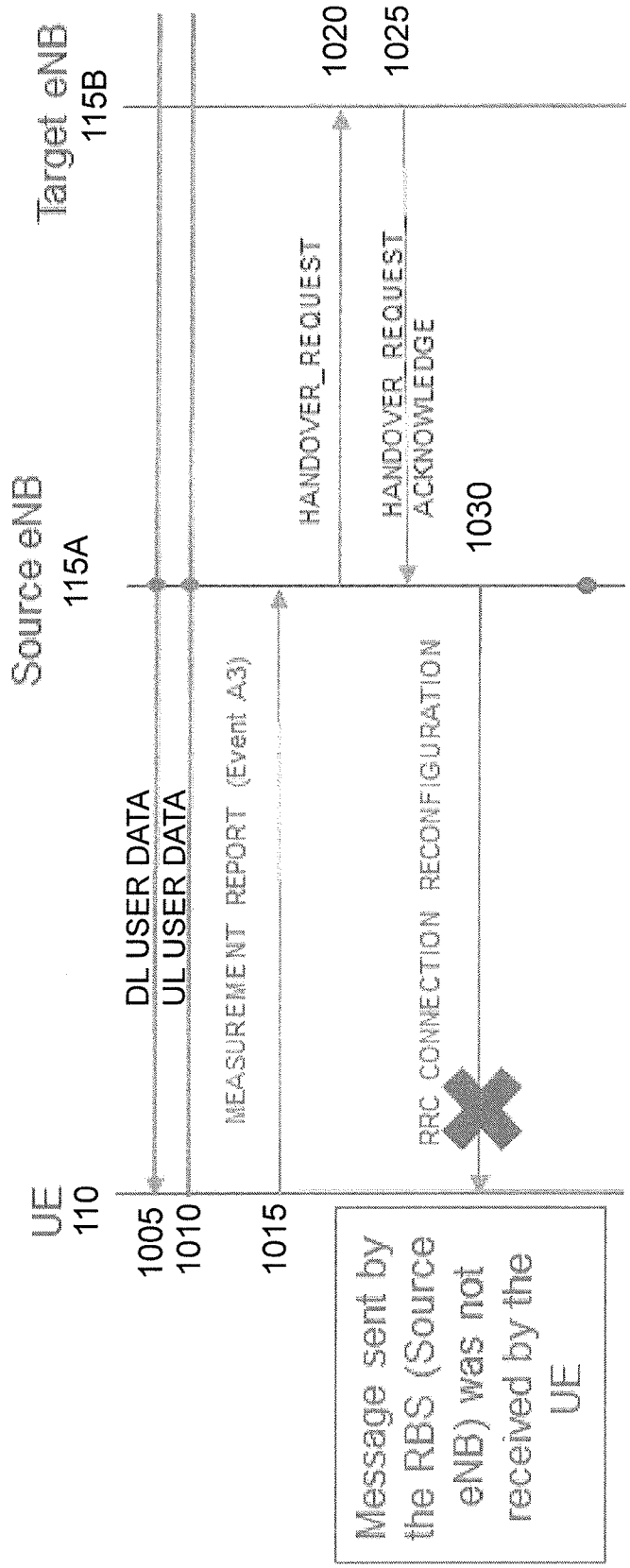
FIG. 10 illustrates a signal flow diagram of a handover procedure, in accordance with certain embodiments.

FIG. 10 illustrates a signal flow diagram of a handover procedure, in accordance with certain embodiments. More particularly, FIG. 10 illustrates an example of a DL failure during an X2 handover procedure. At steps 1005 and 1010, DL User Data is communicated to UE 110 and UL user data is communicated to source eNB 115A, respectively. At step 1015, UE 110 sends a measurement report (Event A3) to source eNB 115A. At step 1020, eNB 115A sends a HANDOVER_REQUEST message to target eNB 115B. At step 1025, target eNB 115B sends a HANDOVER_REQUEST_ACKNOWLEDGE message to source eNB 115A. At step 1030, source eNB 115A sends an RRC CONNECTION RECONFIGURATION message.

In some cases, the RRC CONNECTION RECONFIGURATION message sent by source eNB 115A at step 1030 may not be received by UE 110. In such a case, advanced signaling call flow 315 will show the RRC CONNECTION RECONFIGURATION message just once. This is because the RRC CONNECTION RECONFIGURATION message was transmitted by source eNB 115A and recorded in the network trace, but was never received by UE 110. Thus, the RRC CONNECTION RECONFIGURATION message will not be recorded in the UE logs. By showing that the RRC CONNECTION RECONFIGURATION message was included in the network trace but not the UE log, advanced signaling call flow 315 indicates that the problem was in DL.

Figure 11:
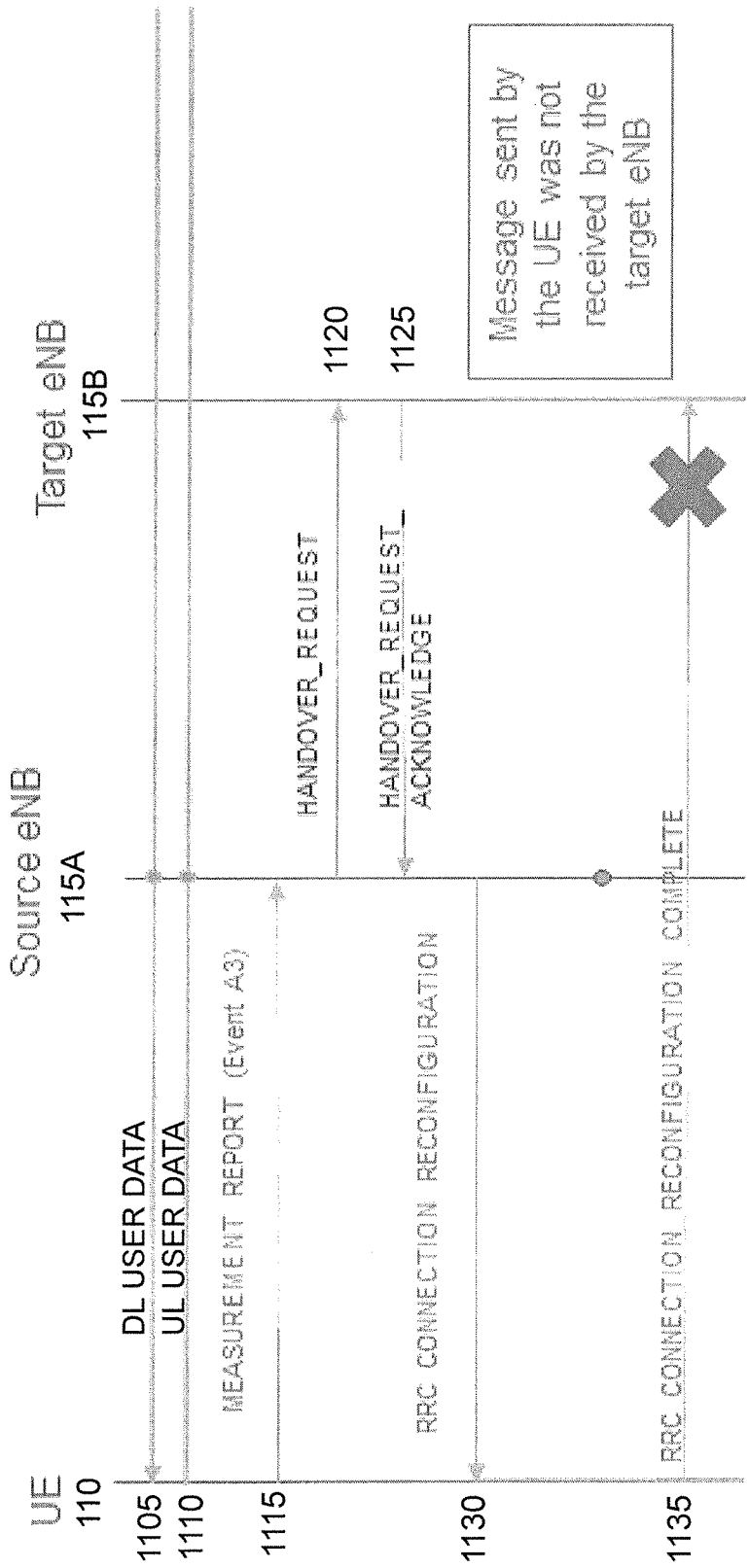
FIG. 11 illustrates a signal flow diagram of a handover procedure, in accordance with certain embodiments.

FIG. 11 illustrates a signal flow diagram of a handover procedure, in accordance with certain embodiments. More particularly, FIG. 11 illustrates an example of an UL failure during an X2 handover procedure. At steps 1105 and 1110, DL User Data is communicated to UE 110 and UL user data is communicated to source eNB 115A, respectively. At step 1115, UE 110 sends a measurement report (Event A3) to source eNB 115A. At step 1120, eNB 115A sends a HANDOVER_REQUEST message to target eNB 115B. At step 1125, target eNB 115B sends a HANDOVER_REQUEST_ACKNOWLEDGE message to source eNB 115A. At step 1130, source eNB 115A sends an RRC CONNECTION RECONFIGURATION message. At step 1135, UE 110 sends an RRC CONNECTION RECONFIGURATION COMPLETE message to target eNB 115B.

In some cases, the RRC CONNECTION RECONFIGURATION COMPLETE message sent by UE 110 to target eNB 115B may not be received by target eNB 115B. In such a case, advanced signaling call flow 315 will show the RRC CONNECTION RECONFIGURATION message two times, since it was transmitted by source eNB 115A and received by UE 110. However, the RRC CONNECTION RECONFIGURATION COMPLETE message will appear just once in advanced signaling call flow 315 because it was transmitted by UE 110 and recorded in the UE log, but never received by target eNB 115B. Because the RRC CONNECTION RECONFIGURATION COMPLETE message was not received by target eNB 115B, it could not be recorded in the network traces. By showing that the RRC CONNECTION RECONFIGURATION COMPLETE message was included in the UE log but not the network trace, advanced signaling call flow 315 indicates that the problem was in UL.

Returning to FIG. 9, advanced signaling call flow processor 310 generates advanced signaling call flow 315, which provides an individual call's radio channel signaling and KPIs from transmitters and receivers, and is used by RCA Diagnosis unit 320 to accurately determine a root cause of the failure using the FSM methodology described above. Advanced signaling call flow 315 may also be used to determine whether the failure is in the DL or UL direction. Thus, the methodology described herein allows the detection of the exact time when every call failed from the radio point of view, what the radio resource management procedure state was at the time of the failure, the UE and eNB Call KPIs at the exact time when every call failed, the eNB Cell KPIs at the exact time when every call failed, information provided by the internal and external events before the call failed. With this information, the RCA diagnosis algorithm may provide: Session ID; internal Call ID to easily find the problematic call in the Advanced Signaling call flow for validation and/or deeper manual analysis; serving cell where the call failed; time stamp; type of failure (e.g., Radio Link Failure (when there is a successful re-establishment) or Drop (when there is no successful/attempted re-establishment)); the root cause of the problematic call; detailed information to provide extra information related to the specific call (e.g., target cell attempted, last distance measured from the eNB before dropping, etc.); S1 Drop Cause provided by the S1 UE Context Release event; internal drop cause provided by the Ericsson Internal_UE_Context_Release.

Figure 12:
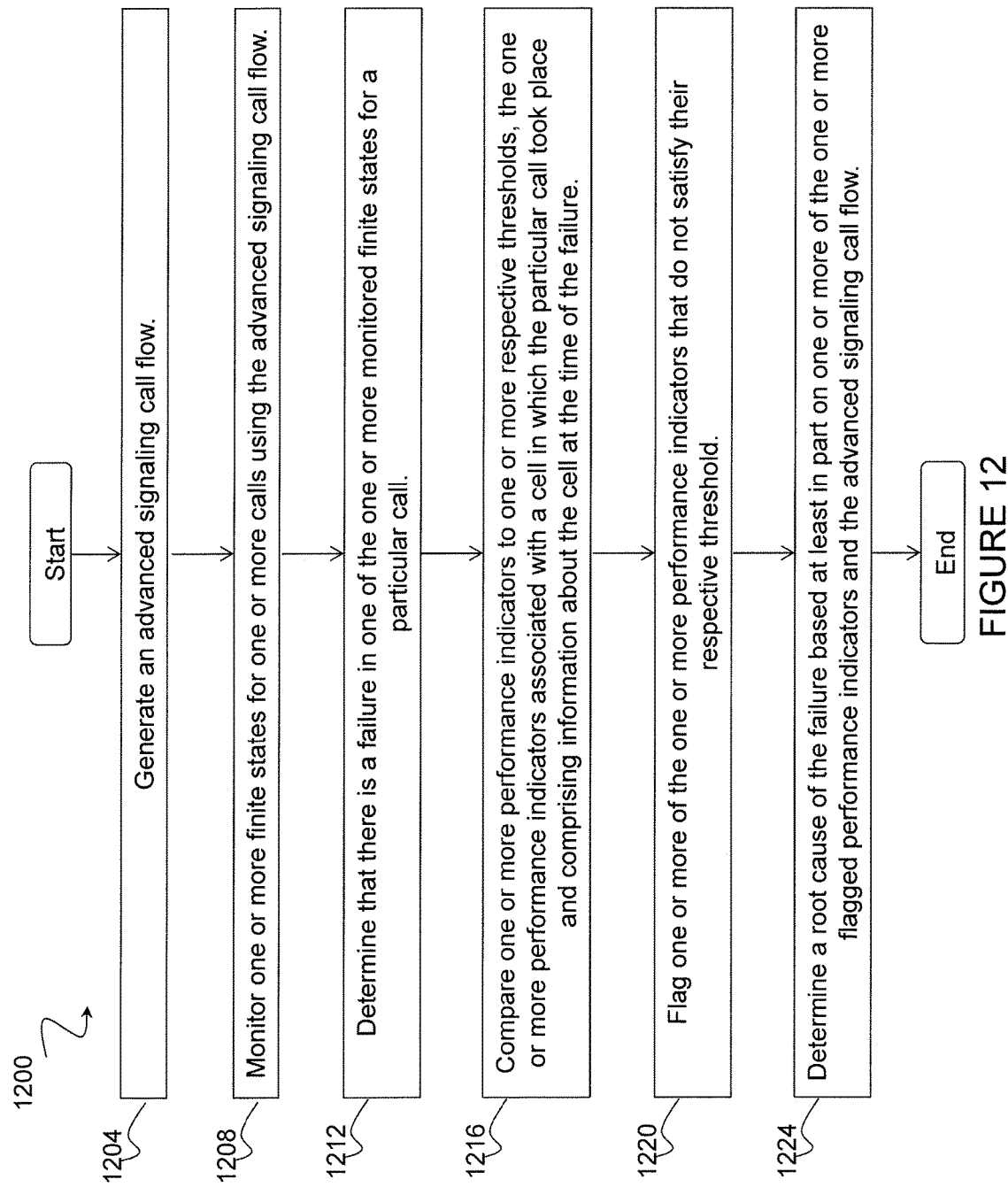
FIG. 12 is a flow chart illustrating a method, in accordance with certain embodiments.

FIG. 12 is a flow chart illustrating a method 1200, in accordance with certain embodiments. The method begins at step 1204, where an advanced signaling call flow is generated. In certain embodiments, generating an advanced signaling call flow may comprise obtaining information about a plurality of events in a cell, wherein the plurality of events comprise one or more of call specific events and cell specific events, the information about the plurality of events including time stamps, each time stamp indicating a time at which an associated one of the plurality of events occurred. Generating an advanced signaling call flow may further comprise correlating the information about the plurality of events in the cell with the one or more performance indicators associated with the cell based at least in part on the time stamp associated with each event, and generating the advanced signaling call flow based at least in part on the correlated information about the events and one or more performance indicators.

In certain embodiments, the obtained information about the plurality of events in the cell may comprise information about one or more of internal events and external events. The internal events may comprise one or more events generated in a network node that provide information related to the network node. The external events may comprise one or more events generated external to the network node and provide information about signaling between the network node and one or more of a user equipment and a core network. The obtained information about the plurality of events in the cell may be based at least in part on one or more of: a Cell Trace Recording comprising a collection of events and radio related measurements applicable to a particular network node; a UE Trace Recording comprising a collection of events and radio related measurements applicable to a particular UE; one or more UE logs; and a time correlated combination of the Cell Trace Recording, the UE Trace Recording, and the one or more UE logs.

At step 1208, one or more finite states for one or more calls are monitored using the advanced signaling call flow. In certain embodiments, monitoring one or more finite states for one or more calls may comprise monitoring the one or more finite states during processing of the advanced signaling call flow. At step 612, it is determined that there is a failure in one of the one or more monitored finite states for a particular call. In certain embodiments, the one or more finite states for one or more calls may comprise Call Starts, RRC Connected, Intra-Cell Reconfiguration, Handover, RRC Re-Establishment, Call Ends, and Idle State.

At step 1216, one or more performance indicators are compared to one or more respective thresholds, the one or more performance indicators associated with a cell in which the particular call took place and comprising information about the cell at the time of the failure. At step 1220, one or more of the one or more performance indicators that do not satisfy their respective threshold are flagged.

At step 1224, a root cause of the failure is determined based at least in part on one or more of the one or more flagged performance indicators and the advanced signaling call flow. In certain embodiments, determining a root cause of the failure based at least in part on one or more of the one or more flagged performance indicators and the advanced signaling call flow may comprise determining a time of the call failure, determining a radio resource management procedure state at the time of the call failure, determining call and cell radio performance indicators at the time of the call failure, and evaluating information provided by one or more internal events before the time of the call failure.

Figure 13:
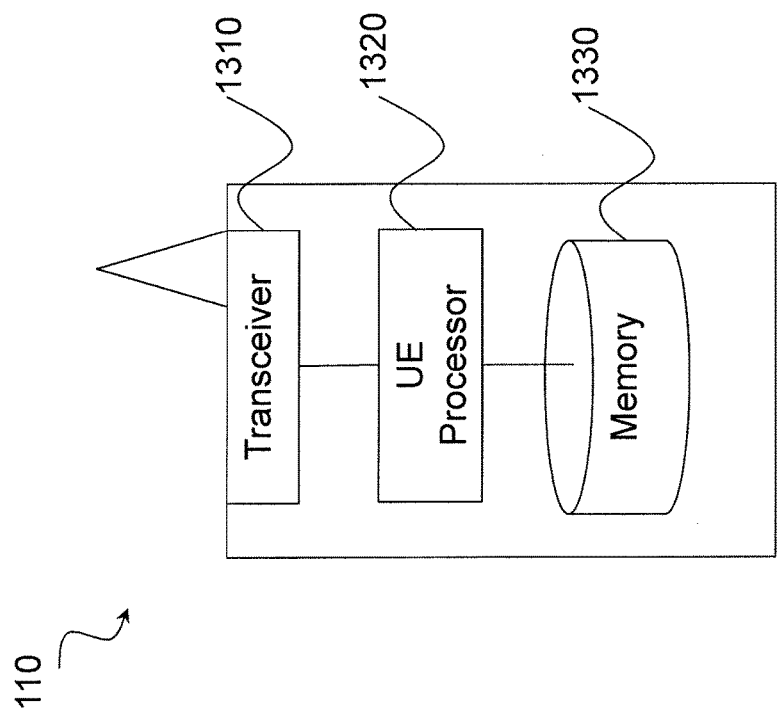
FIG. 13 is a schematic block diagram of an exemplary wireless device, in accordance with certain embodiments.

FIG. 13 is a schematic block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1310, processor 1320, and memory 1330. In some embodiments, transceiver 1310 facilitates transmitting wireless signals to and receiving wireless signals from network node 115 (e.g., via an antenna), processor 1320 executes instructions to provide some or all of the functionality described above as being provided by wireless device 110, and memory 1330 stores the instructions executed by processor 1320.

Processor 1320 may include any suitable combination of hardware and software implemented in one or more units to execute instructions and manipulate data to perform some or all of the described functions of wireless device 110. In some embodiments, processor 1320 may include, for example, one or more computers, one or more central processing units (CPUs), one or more microprocessors, one or more applications, and/or other logic.

Memory 1330 is generally operable to store instructions, such as a computer program, software, an application including one or more of logic, rules, algorithms, code, tables, etc. and/or other instructions capable of being executed by a processor. Examples of memory 1330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 13 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. The determining module may include or be included in processor 1320. The determining module may include analog and/or digital circuitry configured to perform any of the functions of the determining module and/or processor 1320. The functions of the determining module described above may, in certain embodiments, be performed in one or more distinct modules.

The communication module may perform the transmission functions of wireless device 110. The communication module may transmit messages to one or more of network nodes 115 of network 100. The communication module may include a transmitter and/or a transceiver, such as transceiver 1310. The communication module may include circuitry configured to wirelessly transmit messages and/or signals. In particular embodiments, the communication module may receive messages and/or signals for transmission from the determining module.

The receiving module may perform the receiving functions of wireless device 110. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 14:
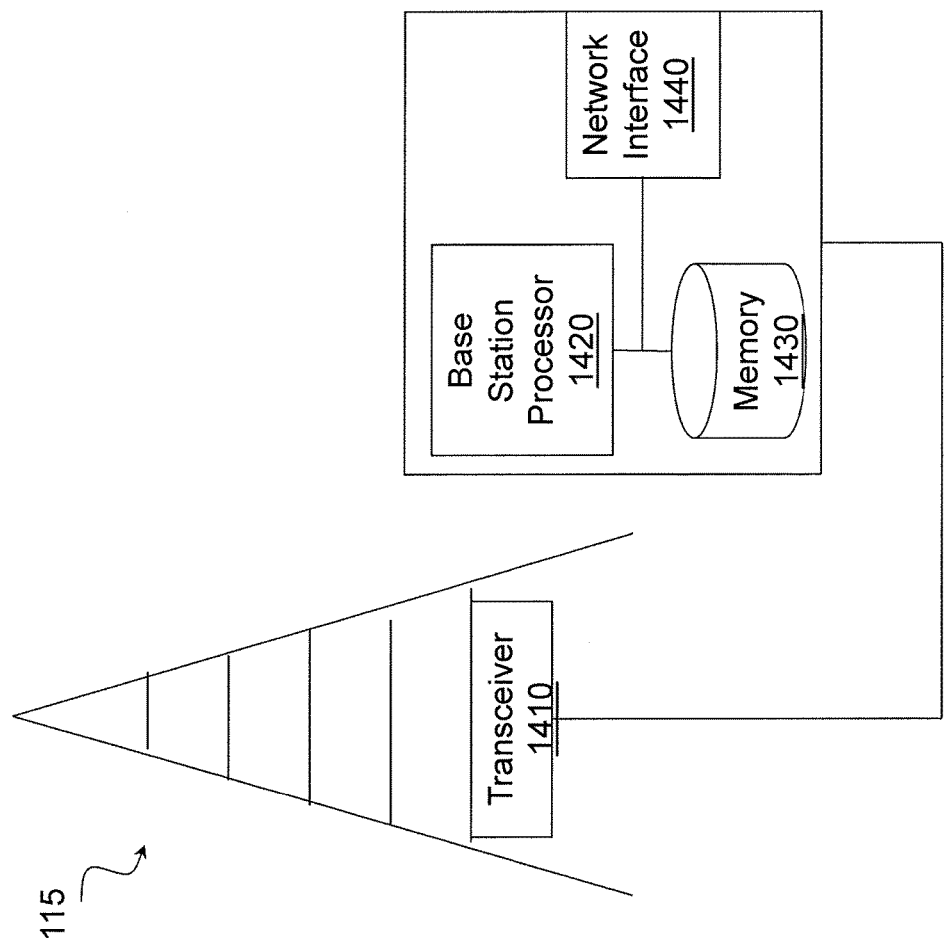
FIG. 14 is a schematic block diagram of an exemplary network node, in accordance with certain embodiments.

FIG. 14 is a schematic block diagram of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1410, processor 1420, memory 1430, and network interface 1440. In some embodiments, transceiver 1410 facilitates transmitting wireless signals to and receiving wireless signals from wireless device 110 (e.g., via an antenna), processor 1420 executes instructions to provide some or all of the functionality described above as being provided by a network node 115, memory 1430 stores the instructions executed by processor 1420, and network interface 1440 communicates signals to backend network components, such as a gateway, switch, router, Internet, Public Switched Telephone Network (PSTN), core network nodes 130, radio network controllers 120, etc.

Processor 1420 may include any suitable combination of hardware and software implemented in one or more modules to execute instructions and manipulate data to perform some or all of the described functions of network node 115. In some embodiments, processor 1420 may include, for example, one or more computers, one or more central processing units (CPUs), one or more microprocessors, one or more applications, and/or other logic.

Memory 1430 is generally operable to store instructions, such as a computer program, software, an application including one or more of logic, rules, algorithms, code, tables, etc. and/or other instructions capable of being executed by a processor. Examples of memory 1430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1440 is communicatively coupled to processor 1420 and may refer to any suitable device operable to receive input for network node 115, send output from network node 115, perform suitable processing of the input or output or both, communicate to other devices, or any combination of the preceding. Network interface 1440 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1420 of FIG. 8. In certain embodiments, the functions of two or more of the various modules may be combined into a single module.

The determining module may perform the processing functions of network node 115. The communication module may perform the transmission functions of network node 115. The communication module may transmit messages to one or more of wireless devices 110. The communication module may include a transmitter and/or a transceiver, such as transceiver 1410. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 14 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 15:
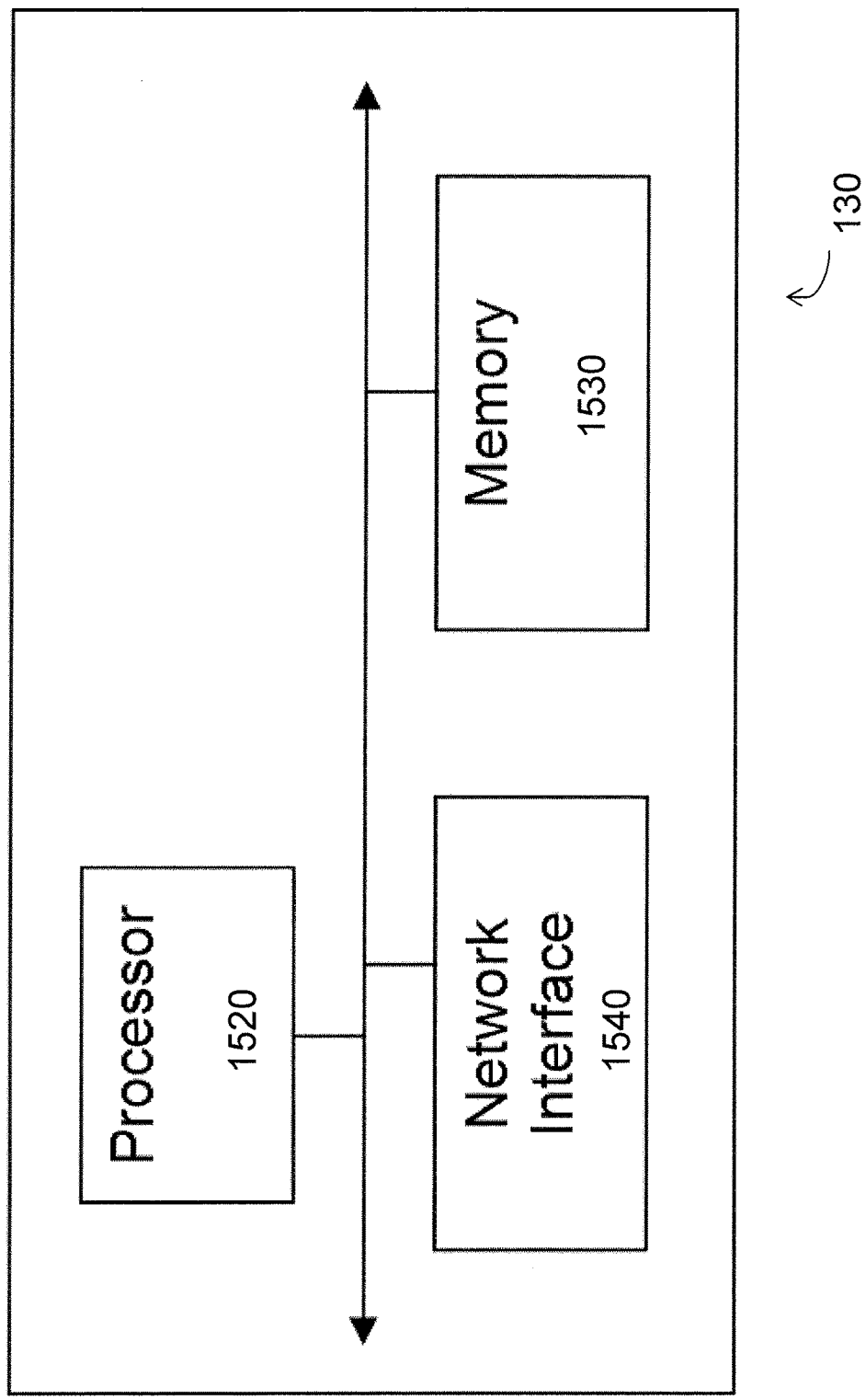
FIG. 15 is a schematic block diagram of an exemplary radio network controller or core network node, in accordance with certain embodiments.

FIG. 15 is a schematic block diagram of an exemplary radio network controller 120 or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 120 or core network node 130 include processor 1520, memory 1530, and network interface 1540. In some embodiments, processor 1520 executes instructions to provide some or all of the functionality described above as being provided by the network node, memory 1530 stores the instructions executed by processor 1520, and network interface 1540 communicates signals to any suitable node, such as a gateway, switch, router, Internet, Public Switched Telephone Network (PSTN), network nodes 115, radio network controllers 120, core network nodes 130, etc.

Processor 1520 may include any suitable combination of hardware and software implemented in one or more modules to execute instructions and manipulate data to perform some or all of the described functions of the radio network controller 120 or core network node 130. In some embodiments, processor 1520 may include, for example, one or more computers, one or more central processing units (CPUs), one or more microprocessors, one or more applications, and/or other logic.

Memory 1530 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1540 is communicatively coupled to processor 1520 and may refer to any suitable device operable to receive input for the network node, send output from the network node, perform suitable processing of the input or output or both, communicate to other devices, or any combination of the preceding. Network interface 1540 may include appropriate hardware (e.g., port, modem, network interface card, etc.) and software, including protocol conversion and data processing capabilities, to communicate through a network.

Other embodiments of the network node may include additional components beyond those shown in FIG. 15 that may be responsible for providing certain aspects of the network node's functionality, including any of the functionality described above and/or any additional functionality (including any functionality necessary to support the solution described above).

Figure 16:
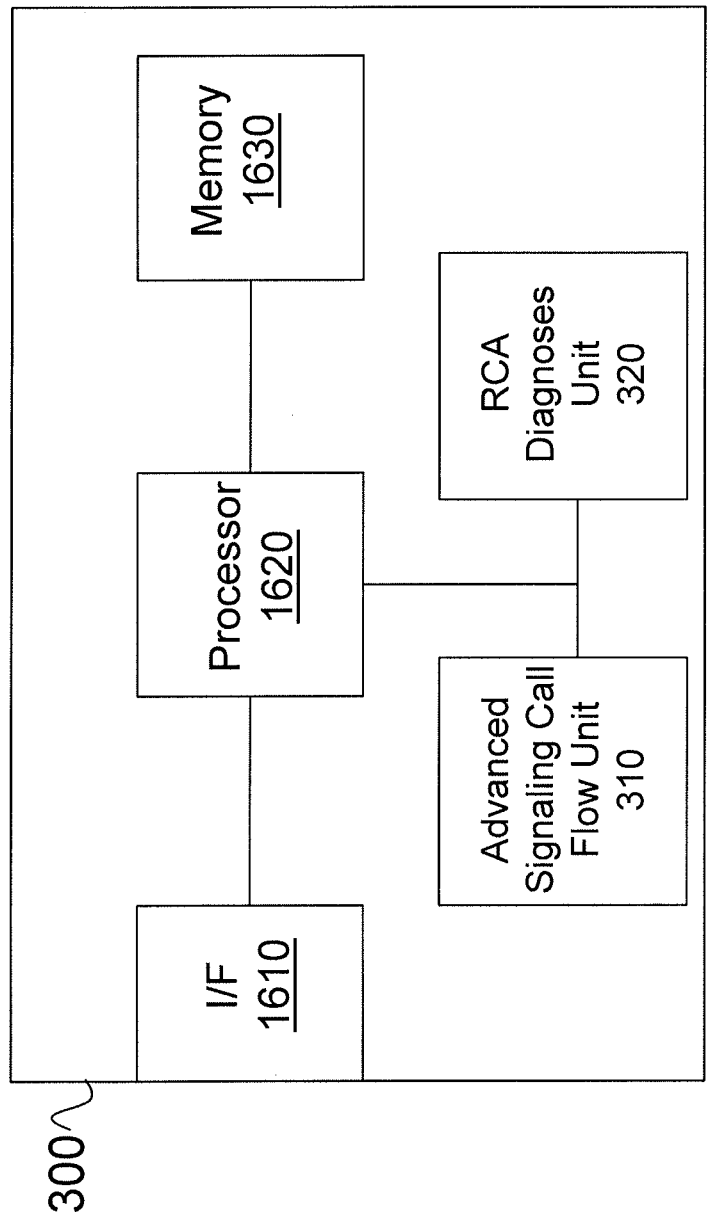
FIG. 16 is a schematic block diagram illustrating a VoLTE RCA Engine, in accordance with certain embodiments.

FIG. 16 is a schematic block diagram illustrating an example VoLTE RCA Engine 300, in accordance with certain embodiments. VoLTE RCA Engine 300 includes interface 1610, processor 1620, and memory 1630. In some embodiments, interface 1610 communicates signals to and from VoLTE RCA Engine 300, processor 1620 executes instructions to provide some or all of the functionality described above as being provided by VoLTE RCA Engine 300, and memory 1630 stores the instructions executed by processor 1620.

VoLTE RCA Engine 300 may be any suitable configuration of hardware and/or software. In certain embodiments, VoLTE RCA Engine 300 may include a network service, any suitable remote service, a mainframe, a host computer, a workstation, a web server, a personal computer, a file server, or any other suitable device. In some embodiments, VoLTE RCA Engine 300 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. The functions of VoLTE RCA Engine 300 may be performed by any suitable combination of one or more servers or other components at one or more locations. In one embodiment the VoLTE RCA Engine is implemented in the ODG. In an embodiment where servers are used, the servers may be public or private servers, and each server may be a virtual or physical server. The server may include one or more servers at the same or at remote locations.

Interface 1610 represents any suitable device operable to receive information from a network, such as network 100 described above, transmit information through network 100, perform suitable processing of the information, communicate to other devices, or any combination of the preceding. For example, interface 1610 may obtain information about a plurality of events in the a cell, and/or obtain information about one or more performance indicators in the cell. As a further example, interface 1610 may receive data from advanced signaling call flow processor 310 and/or RCA Diagnosis unit 320. Interface 1610 represents any port or connection, real or virtual, including any suitable hardware and/or software, including protocol conversion and data processing capabilities, to communicate through a LAN, WAN, or other communication systems that allows exchanging information among one or more components of network 100.

Processor 1620 may include any suitable combination of hardware and software implemented in one or more modules to execute instructions and manipulate data to perform some or all of the described functions of VoLTE RCA Engine 300. For example, in certain embodiments VoLTE RCA Engine 300 may include advanced signaling call flow processor 310 and/or RCA Diagnosis unit 320 described above. In some embodiments, processor 1620 may include, for example, one or more computers, one or more central processing units (CPUs), one or more microprocessors, one or more applications, and/or other logic.

Memory 1630 is generally operable to store instructions, such as a computer program, software, an application including one or more of logic, rules, algorithms, code, tables, etc. and/or other instructions capable of being executed by a processor. Examples of memory 1530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. Memory 1630 may be a database that stores, either permanently or temporarily, any suitable data. Memory 1630 may include any suitable information for use in the operation of VoLTE RCA Engine 300. For example, memory 1630 may include one or more of parameters database 225 and traces database 230.

Other embodiments of VoLTE RCA Engine 300 may include additional components beyond those shown in FIG. 16 that may be responsible for providing certain aspects of the VoLTE RCA Engine 300's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3rd Generation Partnership Project
ASN Abstract Syntax Notation
CTR Call Traces Recording
CM Configuration Management
CTR Call Traces Recordings
FSM Finite State Machine
GCID Global Cell Id
KPI Key Performance Indicators
LTE Long Term Evolution
MO Managed Object
NDO Network Design and Optimization
OSS Operational Support System
ODG OSS Data Gateway
PM Performance Management
PCI Primary Cell Identifiers
QCI Quality Control Index
RAN Radio Access Network
RBS Radio Base Station
RRC Radio Resource Control
RCA Root Cause Analysis
ROP Recording Output Period
RSRP Reference Signal Received Power
RSRQ Reference Signal Received Quality
RF Radio Frequency
SME Subject Matter Expert
TA Timing Advance
TPS Trace Processing Server
TTI Transmission Time Interval
UETR UE Traces Recordings
UE User Equipment
UETR User Equipment Recording
ViLTE Video Over LTE
VoLTE Voice Over LTE

The invention claimed is:

1. A method, comprising:
  generating an advanced signaling call flow;
  monitoring one or more finite states for one or more calls using the advanced signaling call flow;
  determining that there is a failure in one of the one or more monitored finite states for a particular call;
  comparing one or more performance indicators to one or more respective thresholds, the one or more performance indicators associated with a cell in which the particular call took place and comprising information about the cell at the time of the failure;
  flagging one or more of the one or more performance indicators that do not satisfy their respective threshold; and
  determining a root cause of the failure based at least in part on one or more of the one or more flagged performance indicators and the advanced signaling call flow, wherein determining the root cause of the failure based at least in part on one or more of the one or more flagged performance indicators and the advanced signaling call flow comprises:
    determining a time of the call failure;
    determining a radio resource management procedure state at the time of the call failure;
    determining call and cell radio performance indicators at the time of the call failure; and
    evaluating information provided by one or more internal events before the time of the call failure.

2. The method of claim 1, wherein generating an advanced signaling call flow comprises:
obtaining information about a plurality of events in the cell, wherein the plurality of events comprise one or more of call specific events and cell specific events, the information about the plurality of events including time stamps, each time stamp indicating a time at which an associated one of the plurality of events occurred;
correlating the information about the plurality of events in the cell with the one or more performance indicators associated with the cell based at least in part on the time stamp associated with each event; and
generating the advanced signaling call flow based at least in part on the correlated information about the events and one or more performance indicators.

3. The method of claim 2, wherein:
the obtained information about the plurality of events in the cell comprises information about one or more of internal events and external events;
the internal events comprise one or more events generated in a network node that provide information related to the network node; and
the external events comprise one or more events generated external to the network node and provide information about signaling between the network node and one or more of a user equipment and a core network.

4. The method of claim 2, wherein the obtained information about the plurality of events in the cell is based at least in part on one or more of:
a Cell Trace Recording comprising a collection of events and radio related measurements applicable to a particular network node;
a UE Trace Recording comprising a collection of events and radio related measurements applicable to a particular UE;
one or more UE logs; and
a time correlated combination of the Cell Trace Recording, the UE Trace Recording, and the one or more UE logs.

5. The method of claim 1, wherein the one or more finite states for one or more calls comprise Call Starts, RRC Connected, Intra-Cell Reconfiguration, Handover, RRC Re-Establishment, Call Ends, and Idle State.

6. The method of claim 1, wherein monitoring one or more finite states for one or more calls comprises monitoring the one or more finite states during processing of the advanced signaling call flow.

7. A system, comprising:
one or more processors and memory, the memory containing instructions executable by the processor, whereby the one or more processors are configured to:
generate an advanced signaling call flow;
monitor one or more finite states for one or more calls using the advanced signaling call flow;
determine that there is a failure in one of the one or more monitored finite states for a particular call;
compare one or more performance indicators to one or more respective thresholds, the one or more performance indicators associated with a cell in which the particular call took place and comprising information about the cell at the time of the failure;
flag one or more of the one or more performance indicators that do not satisfy their respective threshold; and
determine a root cause of the failure based at least in part on one or more of the one or more flagged performance indicators and the advanced signaling call flow, wherein the one or more processors configured to determine the root cause of the failure based at least in part on one or more of the one or more flagged performance indicators and the advanced signaling call flow comprise one or more processors configured to:
determine a time of the call failure;
determine a radio resource management procedure state at the time of the call failure;
determine call and cell radio performance indicators at the time of the call failure; and
evaluate information provided by one or more internal events before the time of the call failure.

8. The system of claim 7, wherein the one or more processors configured to generate an advanced signaling call flow comprise one or more processors configured to:
obtain information about a plurality of events in the cell, wherein the plurality of events comprise one or more of call specific events and cell specific events, the information about the plurality of events including time stamps, each time stamp indicating a time at which an associated one of the plurality of events occurred;
correlate the information about the plurality of events in the cell with the one or more performance indicators associated with the cell based at least in part on the time stamp associated with each event;
generate the advanced signaling call flow based at least in part on the correlated information about the events and one or more performance indicators.

9. The system of claim 8, wherein:
the obtained information about the plurality of events in the cell comprises information about one or more of internal events and external events;
the internal events comprise one or more events generated in a network node that provide information related to the network node; and
the external events comprise one or more events generated external to the network node and provide information about signaling between the network node and one or more of a user equipment and a core network.

10. The system of claim 8, wherein the obtained information about the plurality of events in the cell is based at least in part on one or more of:
a Cell Trace Recording comprising a collection of events and radio related measurements applicable to a particular network node;
a UE Trace Recording comprising a collection of events and radio related measurements applicable to a particular UE;
one or more UE logs; and
a time correlated combination of the Cell Trace Recording, the UE Trace Recording, and the one or more UE logs.

11. The system of claim 7, wherein the one or more finite states for one or more calls comprise Call Starts, RRC Connected, Intra-Cell Reconfiguration, Handover, RRC Re-Establishment, Call Ends, and Idle State.

12. The system of claim 7, wherein the one or more processors configured to monitor one or more finite states for one or more calls comprises one or more processors configured to monitor the one or more finite states during processing of the advanced signaling call flow.

13. A computer program product comprising instructions stored on non-transient computer-readable media which, when executed by a processor, perform the acts of:
generating an advanced signaling call flow;
monitoring one or more finite states for one or more calls using the advanced signaling call flow;

determining that there is a failure in one of the one or more monitored finite states for a particular call;

comparing one or more performance indicators to one or more respective thresholds, the one or more performance indicators associated with a cell in which the particular call took place and comprising information about the cell at the time of the failure;

flagging one or more of the one or more performance indicators that do not satisfy their respective threshold; and determining a root cause of the failure based at least in part on one or more of the one or more flagged performance indicators and the advanced signaling call flow, wherein determining the root cause of the failure based at least in part on one or more of the one or more flagged performance indicators and the advanced signaling call flow comprises:

determining a time of the call failure;

determining a radio resource management procedure state at the time of the call failure;

determining call and cell radio performance indicators at the time of the call failure; and evaluating information provided by one or more internal events before the time of the call failure.

14. The computer program product of claim 13, wherein generating an advanced signaling call flow comprises:

obtaining information about a plurality of events in the cell, wherein the plurality of events comprise one or more of call specific events and cell specific events, the information about the plurality of events including time stamps, each time stamp indicating a time at which an associated one of the plurality of events occurred;

correlating the information about the plurality of events in the cell with the one or more performance indicators associated with the cell based at least in part on the time stamp associated with each event;

generating the advanced signaling call flow based at least in part on the correlated information about the events and one or more performance indicators.

15. The computer program product of claim 14, wherein:

the obtained information about the plurality of events in the cell comprises information about one or more of internal events and external events;

the internal events comprise one or more events generated in a network node that provide information related to the network node; and the external events comprise one or more events generated external to the network node and provide information about signaling between the network node and one or more of a user equipment and a core network.

16. The computer program product of claim 14, wherein the obtained information about the plurality of events in the cell is based at least in part on one or more of:

a Cell Trace Recording comprising a collection of events and radio related measurements applicable to a particular network node;

a UE Trace Recording comprising a collection of events and radio related measurements applicable to a particular UE;

one or more UE logs; and a time correlated combination of the Cell Trace Recording, the UE Trace Recording, and the one or more UE logs.

17. The computer program product of claim 13, wherein the one or more finite states for one or more calls comprise Call Starts, RRC Connected, Intra-Cell Reconfiguration, Handover, RRC Re-Establishment, Call Ends, and Idle State.

18. The computer program product of claim 13, wherein monitoring one or more finite states for one or more calls comprises monitoring the one or more finite states during processing of the advanced signaling call flow.

* * * * *